(12) United States Patent
Prasad et al.

(10) Patent No.: US 7,634,250 B1
(45) Date of Patent: Dec. 15, 2009

(54) SIGNAL CONDITIONER AND METHOD FOR COMMUNICATING OVER A SHARED TRANSPORT MEDIUM A COMBINED DIGITAL SIGNAL FOR WIRELESS SERVICE

(75) Inventors: Sunil Prasad, Ashburn, VA (US); Janet Ruth Dianda, Herndon, VA (US)

(73) Assignee: Sprint Spectrum L.P., Overland Park, KS (US)

(*) Notice: Subject to any disclaimer, the term of this patent is extended or adjusted under 35 U.S.C. 154(b) by 481 days.

(21) Appl. No.: 11/378,998

(22) Filed: Mar. 17, 2006

(51) Int. Cl.
*H04M 11/00* (2006.01)
(52) U.S. Cl. .............. 455/403; 455/7; 455/14; 455/20; 455/21; 455/561
(58) Field of Classification Search ............... 455/403, 455/7, 14, 20, 21, 22, 561, 562.1
See application file for complete search history.

(56) References Cited

U.S. PATENT DOCUMENTS

| | | | |
|---|---|---|---|
| 5,682,256 A | | 10/1997 | Motley et al. |
| 5,809,422 A | * | 9/1998 | Raleigh et al. ............ 455/449 |
| 5,949,564 A | | 9/1999 | Wake |
| 6,154,443 A | | 11/2000 | Huang et al. |
| 6,525,855 B1 | | 2/2003 | Westbrook et al. |
| 6,781,981 B1 | * | 8/2004 | Kimbrough ............ 370/352 |
| 6,788,666 B1 | | 9/2004 | Linebarger et al. |
| 6,826,163 B2 | | 11/2004 | Mani et al. |
| 6,826,164 B2 | | 11/2004 | Mani et al. |
| 6,831,901 B2 | | 12/2004 | Millar |
| 6,963,552 B2 | | 11/2005 | Sabat et al. |
| 2001/0036163 A1 | | 11/2001 | Sabat et al. |
| 2002/0186436 A1 | * | 12/2002 | Mani et al. ................. 359/145 |
| 2002/0191565 A1 | | 12/2002 | Mani et al. |
| 2003/0016418 A1 | | 1/2003 | Westbrook et al. |
| 2003/0157943 A1 | * | 8/2003 | Sabat, Jr. ................... 455/456 |
| 2004/0057393 A1 | | 3/2004 | Bianchi et al. |
| 2004/0198453 A1 | * | 10/2004 | Cutrer et al. ............ 455/562.1 |
| 2005/0003769 A1 | | 1/2005 | Foerster et al. |
| 2005/0147067 A1 | | 7/2005 | Mani et al. |
| 2005/0172198 A1 | | 8/2005 | Millar |
| 2005/0226625 A1 | | 10/2005 | Wake et al. |
| 2005/0243785 A1 | | 11/2005 | Sabat et al. |

(Continued)

OTHER PUBLICATIONS

U.S. Appl. No. 11/689,808, filed Mar. 22, 2007.

(Continued)

*Primary Examiner*—Joseph H Feild
*Assistant Examiner*—Huy D Nguyen

(57) ABSTRACT

A signal conditioner (SC) and method for performing communications via a shared transport medium between a base transceiver station (BTS) and a remote antenna entity (RAE). A first SC is connected to the BTS and a second SC is connected to the RAE. Each SC interfaces to the transport medium. The first SC receives an RF signal representing a combined digital signal (CDS) from the BTS. The first SC recovers and conditions the CDS, and then transmits the conditioned CDS to the second SC via the transport medium. The second SC receives the conditioned CDS, recovers the CDS, produces an RF signal representing the CDS, and transmits this RF signal to the RAE. The RAE sends this RF signal to an antenna of the RAE for transmission of this RF signal via the antenna. First SC and second SC also facilitate communication of a CDS from RAE to BTS.

36 Claims, 6 Drawing Sheets

U.S. PATENT DOCUMENTS

2005/0270221 A1  12/2005  Fedotov et al.
2005/0282536 A1* 12/2005  McClure et al. .......... 455/422.1
2006/0165155 A1   7/2006  Liu et al.

OTHER PUBLICATIONS

U.S. Appl. No. 11/405,917, filed Apr. 18, 2006.
U.S. Appl. No. 11/838,756, filed Aug. 14, 2007.
U.S. Appl. No. 11/838,744, filed Aug. 14, 2007.
Commissioners Michael J. Copps and Kevin J. Martin, First Report and Order, In The Matter of Revision of part 15 of the Commission's Rules Regarding Ultra-Wideband Transmission Systems, ET Docket 98-153, Apr. 22, 2002.
Richard H. Blackwell, "Digital Sampling Power Analyzer for GSM and CDMA," Boonton Electronics, Mar. 31, 2004.
CDMA Technology, Multiple Access, downloaded from the World Wide Web at http://www.tsp.ece.mcgill.ca/Telecom/Docs/cdma. html on Jul. 5, 2007.
CDMA Overview—Access Schemes, downloaded from the World Wide Web at http://www.umtsworld.com/technology/cdmabasics. htm on Jul. 5, 2007.
Code Division Multiple Access, downloaded from http://en. wikipedia.org/wiki/CDMA on Jul. 5, 2007.
Binary Numbers—Adding and Subtracting Binary Numbers, downloaded from http://www.helpwithpcs.com/courses/adding-subtracting-binary-numbers.htm on Jul. 5, 2007.
David Barras, et.al, A Comparison Between ultra-Wideband and Narrowband Transceivers, Laboratory for Electionics, Swiss Federal Institute of Technology (ETH), Zurich, Switzerland, Oct. 26, 2004.
"FCC Approves First Commercial UWB Chipset", downloaded from the World Wide Web at http://www.wi-fiplanet.com.news/print.php/3392771 on Nov. 29, 2006.
David Yaish, Why MB-OFDM Is The Best Solution For The Industry, UWB Insider, Apr. 29, 2004.
Ultra-wideband, downloaded from http://en.wikipedia.org/wiki/Ultra_wideband on Dec. 13, 2006.
Mike Harwood, Understanding Networking Components and Devices for the Network+Exam, downloaded from the World Wide Web at http://www.examcram2.com/articles/article.asp?p=398091&seqNum=13&rl=1 on Dec. 28, 2006.
Want WiMax?, Aug. 31, 2006, downloaded from the World Wide Web at http://www.navini.com/Website/assets/pdfs/Brochures/Navini_Overview_04.pdf.
PCMAG, Encyclopedia, Definition of Baseband, Computer Desktop Encyclopedia, downloaded from the World Wide Web at http://www.pcmag.com/encyclopedia_term/0,2452,t=baseband&i=38438,00.asp on Jan. 4, 2007.
Domestic AC Power Plugs and Sockets, downloaded from the World Wide Web on at http://en.wikipedia.org/wiki/Domestic_AC_power_plugs_and_sockets on Aug. 4, 2006.
Federal Communications Commission, "What is a Broadband", downloaded from the World Wide Web at http://www.fcc.gov/cgb/broadband.html on Dec. 28, 2006.
James Stenger, "Broadband power Line Tutorial", Wave Report, downloaded from the World Wide Web at http://www.wave-report.com/tutorials/bpl.htm on Jun. 2, 2006.
Robert Valdes, "How Broadband Over Powerlines Works", How Stuff Works, downloaded from the World Wide Web at http://computer.howstuffworks.com/bpl.htm/printable on Jun. 2, 2006.

* cited by examiner

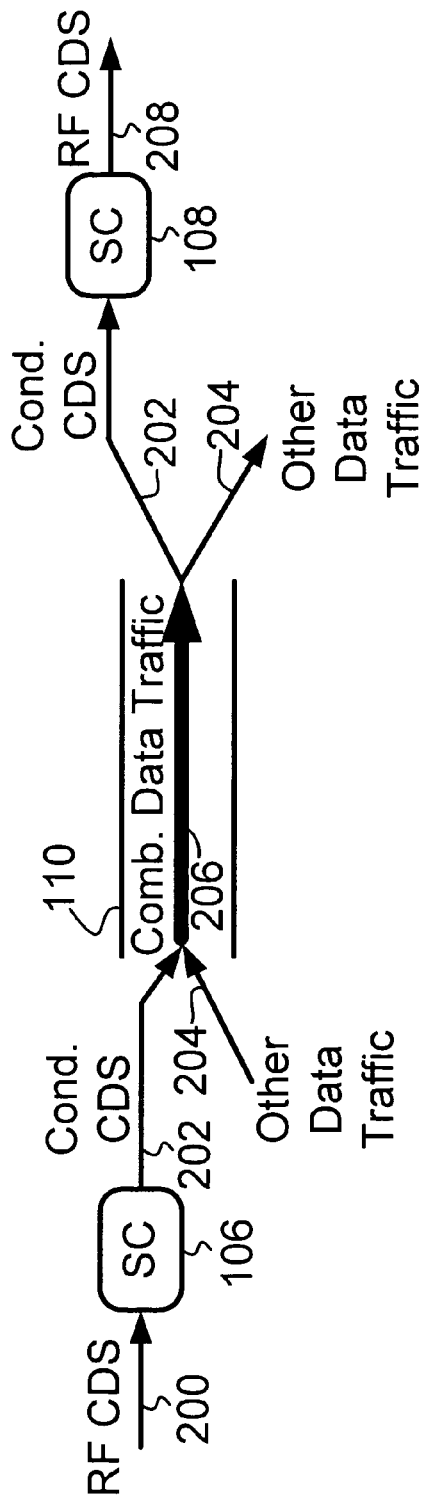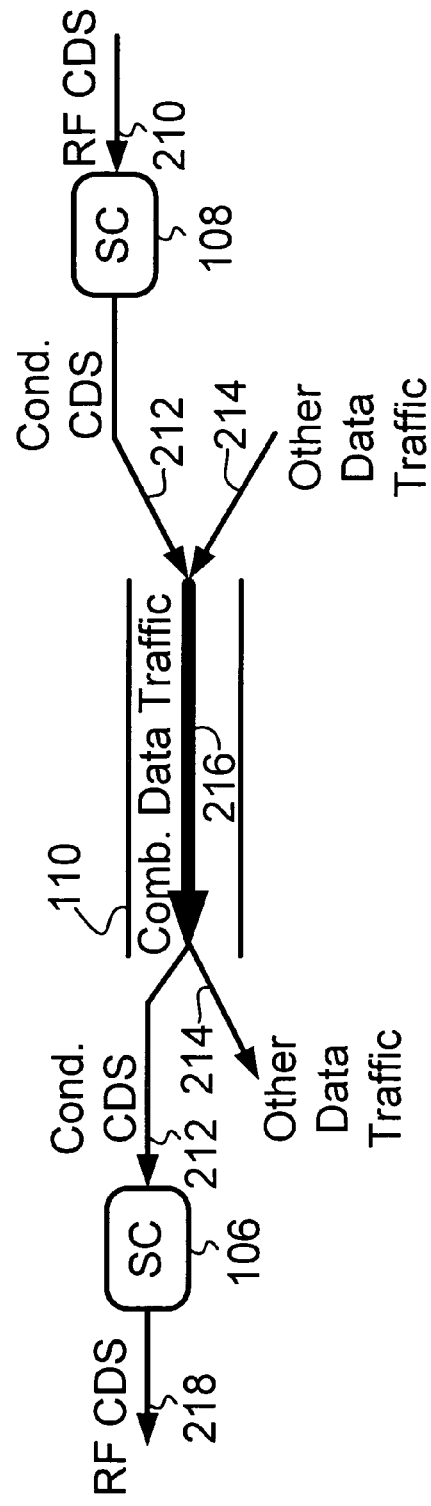

SIGNAL CONDITIONER AND METHOD FOR COMMUNICATING OVER A SHARED TRANSPORT MEDIUM A COMBINED DIGITAL SIGNAL FOR WIRELESS SERVICE

FIELD OF INVENTION

The present invention relates to communication of digital signals, and more particularly to communication of a combined digital signal for wireless service over a shared transport medium.

DESCRIPTION OF RELATED ART

Wireless carriers provide wireless communication service to wireless communication customers. In order to improve the wireless communication service provided to such customers, some wireless carriers have begun implementing or are considering implementing a distributed antenna system (DAS) to extend the range of their existing wireless network infrastructure.

A current wireless network infrastructure may include multiple base transceiver stations (BTSs) that radiate radio frequency (RF) signals from an antenna so as to form a cell and/or sector. A wireless carrier may extend the range of its wireless network infrastructure by connecting a DAS to one or more of the BTSs. Each DAS may include one or more remote antenna entities (RAEs), a transport medium that connects a BTS to the one or more remote antenna entities of the DAS, and one or more antennas connected to each remote entity. A BTS can provide RF signals to one or more remote antenna entities (i.e., located remote from the BTS) and, in turn, the one or more antennas connected to the remote antenna entities may radiate the received RF signals so as to extend a cell and/or sector coverage to the vicinity of each remote entity (i.e., at a location remote from the BTS).

In current implementations, a dedicated transport medium, such as a fiber optic cable, is typically used to provide a communication path between a BTS and the remote antenna entities of the DAS. The dedicated transport medium is a mechanism in which all data transported through the transport medium passes through the BTS and the DAS. A dedicated transport medium is necessary because the signals currently transmitted between the BTS and the DAS take up most, if not all, of the capacity of the transport medium.

As an example, a BTS and a DAS may carry out communications between themselves and, in turn, with wireless communication devices, using a dedicated transport mechanism to carry wireless service signaling in accordance with the Code Division Multiple Access (CDMA) protocol. The CDMA protocol uses a spread spectrum signal in which the users' information signals to be communicated (the traffic channels) plus control information (the control channels) are spread over a much wider band channel than what would be required to communicate the information signal before the information signal is spread over that channel. This enables the signal to be resilient to interference, allowing more users to share the same spectrum, thereby increasing spectral efficiency.

In a typical BTS, a combined digital signal (representing the information signals and the control information) then modulates a Radio Frequency (RF) carrier, forming an analog RF signal which is then sent through an antenna feed from the BTS to an antenna for propagation over the air. If instead it is desired to send the signal through a transport medium to a remote entity of a DAS, then the analog RF signal is sent through the antenna feed from the BTS to another entity which then sends the analog RF signal over the transport medium. Alternatively, an entity may sample the analog RF signal sent through the antenna feed, at a rate at least twice that of the bandwidth, according to the Nyquist theorem, to create a digitized representation of the analog RF signal, then send the digitized RF signal to a remote entity of the DAS over the transport medium. In either case, the resulting bandwidth required to send the signal from the BTS to the remote entity is much greater than the original combined digital signal generated inside of the BTS.

A dedicated transport medium is therefore necessary between the BTS and the remote entity of the DAS so as to allow for communication of the high-bandwidth analog RF signal or the digitized representation of the analog RF signal.

Communicating signals between a BTS and a remote entity of a DAS using such high bandwidth of a dedicated transport medium, however, is undesirable, as it can be quite costly to provide and maintain such a dedicated transport medium. An improvement is therefore desired.

SUMMARY

The present invention is directed to signal conditioners and methods for communicating a combined digital signal, for wireless service, over a shared transport medium, which provides a solution requiring much less bandwidth than solutions that require high bandwidth. The combined digital signal may represent the total information (e.g., a CDMA, Time Division Multiple Access (TDMA), or Orthogonal Frequency Division Multiple Access (OFDMA) information signal before it is converted to an analog RF signal) to be radiated over an air interface from a base transceiver station (BTS). Alternatively, the combined digital signal may represent the total information to be transmitted to the BTS from a remote antenna entity (RAE) (or multiple remote antenna entities) of a distributed antenna system (DAS) connected to the BTS.

The combined digital signal is the recovery of the original digital signal from the analog RF signal such that, much less bandwidth may be used to carry the combined digital signal to the DAS from the BTS (or to the BTS from the DAS) than sending either the analog RF signal or a digitized representation of the analog RF signal. The use of much less bandwidth may therefore facilitate use of a shared transport medium, rather than a dedicated transport medium.

The combined digital signal is produced by combining digital signals from multiple communication channels. These communication channels may comprise multiple user traffic channels (e.g., voice channels and/or data channels) and control channels used for communication between the BTS and the users' wireless devices. The data channels may communicate data that includes packetized voice data.

The combined digital signal may be (i) produced at a BTS (ii) provided to a signal conditioner via an antenna feed extending from the BTS to the signal conditioner, (iii) transmitted from the signal conditioner to a remote signal conditioner via a shared transport medium, (iv) recovered at the remote signal conditioner, and (v) transmitted to a remote antenna entity of a DAS via a communication connection extending from the remote signal conditioner to the remote antenna entity. The combined digital signal may be transmitted to the remote antenna entity as an analog RF signal representing the combined digital signal. The remote antenna entity may radiate the RF signal over an air interface to one or more wireless communication devices.

The remote antenna entity of the DAS may receive an analog RF signal (i.e., a second RF signal) representing a second combined digital signal by receiving multiple communication channels from one or more wireless communication devices. The remote antenna entity may provide the second RF signal to the remote signal conditioner. The remote signal conditioner may recover the second combined digital signal and provide the second combined digital signal to the transport medium for transmission, in turn, to the signal conditioner connected to the BTS. The signal conditioner connected to the BTS may receive the second combined digital signal and produce yet another RF signal (i.e., a third RF signal) representing the second combined digital signal. The signal conditioner connected to the BTS may transmit the third RF signal to the BTS via the antenna feed connecting the signal conditioner and the BTS. The BTS may then communicate the second combined digital signal, as the third RF signal or recovered from the third RF signal, to one or more other devices in communication with the BTS.

In one respect, an exemplary embodiment of the present invention may take the form of a method of communication between a BTS and a remote antenna entity of a DAS. The method includes a first signal conditioner receiving a first signal representing a combined digital signal. The first signal is an RF signal transmitted to the first signal conditioner from the BTS via an antenna feed that extends from the first signal conditioner to the BTS. The first signal is produced by modulating an RF carrier with the combined digital signal. The combined digital signal is produced by combining digital signals from multiple communication channels and control channels. Next, the first signal conditioner (i) demodulates the received first signal so as to recover the combined digital signal, and (ii) conditions the recovered combined digital signal so as to produce a second signal representing the combined digital signal. The second signal is then transmitted over a transport medium from the first signal conditioner to a second signal conditioner. The second signal conditioner receives the second signal from the transport medium, conditions the received second signal so as to recover the combined digital signal, modulates another RF carrier with the combined digital signal received from the transport medium so as to produce a third signal representing the combined digital signal, and transmits the third signal to a remote antenna entity. The remote antenna entity receives the third signal representing the combined digital signal, and transmits the third signal to an antenna connected to the remote antenna entity for transmission of the third signal over an air interface.

In another respect, an exemplary embodiment of the present invention may take the form of a method carried out at a first signal conditioner. The method includes the first signal conditioner receiving an RF signal representing a combined digital signal. The RF signal is transmitted to the first signal conditioner via an antenna feed extending from a BTS to the first signal conditioner. Next, the method includes the first signal conditioner demodulating the received first RF signal so as to recover the combined digital signal, and providing the recovered combined digital signal to a transport medium for transmission, in turn, to a second signal conditioner.

In yet another respect, an exemplary embodiment of the present invention may take the form of a signal conditioner that includes (i) an antenna feed interface, (ii) a transport medium interface for interfacing to a transport medium, (iii) a demodulator, and (iv) a conditioning device. The antenna feed interface is connected to a BTS via an antenna feed and is arranged to receive an RF signal representing a combined digital signal. The RF signal is produced by modulating an RF carrier with the combined digital signal. The combined digital signal is produced by combining digital signals from multiple communication channels and control channels. The demodulator is arranged to (i) receive the RF signal from the antenna feed interface, (ii) demodulate the RF signal so as to recover the combined digital signal, and (iii) provide the recovered combined digital signal to the conditioning device that conditions the recovered combined digital signal for transmission of the combined digital signal over the transport medium to a remote signal conditioner.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

BRIEF DESCRIPTION OF THE DRAWINGS

Exemplary embodiments of the invention are described herein with reference to the drawings, in which:

FIG. 2A depicts an exemplary arrangement for transporting data through a transport medium from a first signal conditioner to a second signal conditioner;

FIG. 2B depicts an exemplary arrangement for transporting data through the transport medium from the second signal conditioner to the first signal conditioner;

DETAILED DESCRIPTION

1. Overview

The present invention provides for signal conditioners, systems, and methods for performing bidirectional communications between a base transceiver station (BTS) and a distributed antenna system (DAS). The BTS and the DAS may each be arranged for performing wireless communications with one or more wireless communication devices. The communications between the BTS and the DAS may be carried out, at least in part, over a transport medium between (i) a signal conditioner connected to the BTS, and (ii) a signal conditioner connected to a remote antenna entity of the DAS.

2. Exemplary Architecture

Figure 1:
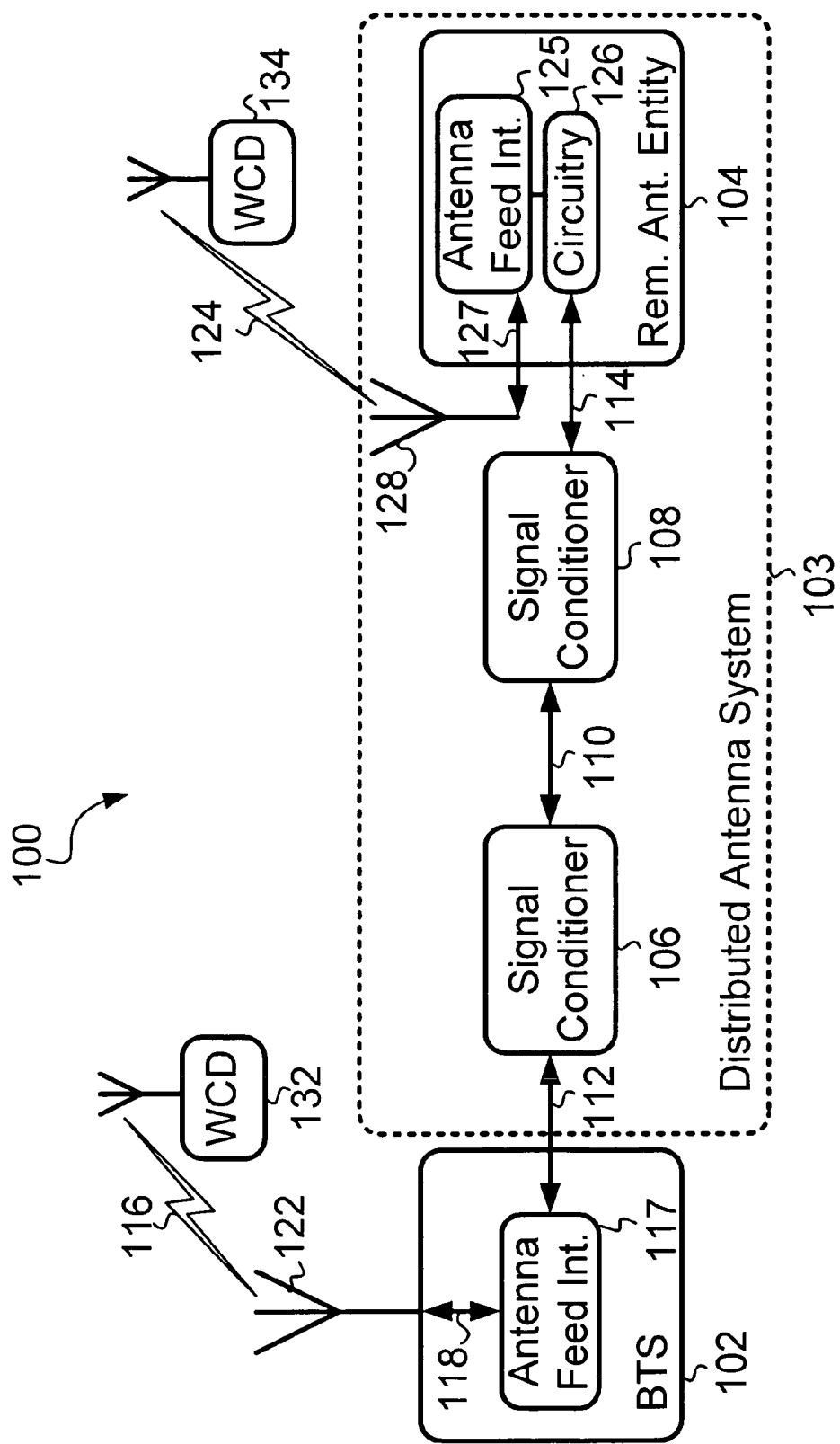
FIG. 1 illustrates an exemplary system for carrying out the invention.

FIG. 1 depicts an exemplary system 100 for carrying out the invention. System 100 includes a BTS 102 and a Distributed Antenna System (DAS) 103. DAS 103 includes a remote antenna entity (RAE) 104, a signal conditioner 106, a signal conditioner 108, and a transport medium 110. System 100 also includes: (i) an antenna feed 112 providing a communication path between BTS 102 to signal conditioner 106, and (ii) a communication connection 114 connecting RAE 104 to signal conditioner 108. DAS 103 may include one or more other remote antenna entities that each communicate with BTS 102 via (e.g., by way of, or over) signal conditioner 106, signal conditioner 108, and transport medium 110, or via other signal conditioners and transport mediums that may be a part of DAS 103. System 100 also includes wireless communication device 132 and wireless communication device 134.

It should be understood, however, that this and other arrangements described herein are provided for purposes of example only. As such, those skilled in the art will appreciate that other arrangements and other elements (e.g. machines, interfaces, functions, orders, and groupings of functions, etc.) can be used instead, and some elements may be omitted altogether. Further, many of the elements described herein are functional entities that may be implemented as discrete or distributed components or in conjunction with other components, in any suitable combination and location, or as any suitable combination of hardware, firmware, and/or software.

BTS 102 may be part of a radio access network (RAN) for performing wireless communications. The RAN may include one or more other BTSs in addition to BTS 102. BTS 102 forms a corresponding cell and/or sector by radiating signals away from BTS 102. The signals radiated away from BTS 102 form an RF air interface 116 and may be arranged according to one of the CDMA, TDMA, or OFDMA air interface protocols or some other air interface protocol.

The signals radiated away from BTS 102 may be arranged as multiple forward-link communication channels. The forward-link communication channels are for performing communications from BTS 102 to one or more wireless communication devices (including wireless communication device (WCD) 132).

As an example, in accordance with the CDMA air interface protocol, the multiple forward-link communication channels may include a pilot channel, a medium access control channel, a control channel, a paging channel, a pilot channel, and/or a traffic channel. The traffic channel may include a voice channel and/or a data channel. Other examples of forward-link communication channels and other examples of the quantity of forward-link communication channels that make up RF air interface 116 are also possible.

RF air interface 116 also includes multiple reverse-link communication channels that radiate towards BTS 102 from one or more wireless communication devices (including WCD 132). The multiple reverse-link communication channels are for performing communications from the one or more wireless communication devices (including WCD 132) to BTS 102. The forward-link channels and the reverse-link channels of air interface 116 are arranged according to the same air interface protocol.

BTS 102 may be connected to a variety of networks and/or network entities. For example, BTS 102 may be connected to a base station controller (BSC), which is then connected to a telecommunications switch or gateway, such as a mobile switching center (MSC) or packet data serving node (PDSN). The switch or gateway may then be connected with a transport network, such as the public switched telephone network (PSTN) or a packet-switched network (e.g., the Internet).

BTS 102 includes an antenna feed interface 117 that connects to antenna feed 112 and an antenna feed 118. Antenna feed 112 connects BTS 102 to signal conditioner 106 (which connects to RAE 104 via the transport medium 110 and signal conditioner 108). Antenna feed 118 connects BTS 102 to antenna 122, and provides a communication path between BTS 102 and antenna 122. BTS 102 may include one or more other antenna feeds (not shown) and one or more other antennas (not shown). Each of the other antenna feeds may be connected to one or more of the other antennas.

Antenna feed interface 117 may be arranged for one or more sectors. As an example, antenna feed interface 117 may be arranged to have (i) a first interface that connects to antenna feed 118 and is designated for a first sector, and (ii) a second interface that connects to antenna feed 112 and is designated for a second sector. Other exemplary arrangements of antenna feed interface 117 are also possible.

Each antenna feed described herein may include any means for carrying communications to and from BTS 102 or to and from RAE 104. As an example, antenna feed 112 may include one or more coaxial cables for carrying communications to BTS 102 from signal conditioner 106, and one or more coaxial cables for carrying communications to signal conditioner 106 from BTS 102. Other exemplary means of an antenna feed carrying communications are also possible.

Antenna 122 may receive signals from RF air interface 116 and provide the received signals to the BTS 102 via antenna feed 118. BTS 102 can receive other signals from other sources as well. For example, BTS 102 may be divided into multiple sectors and BTS 102 may receive signals sent from signal conditioner 106 via antenna feed 112.

BTS 102 may provide signals for a certain sector to antenna 122 via antenna feed 118. Another antenna feed 112, connected to another sector of BTS 102, can provide signals to RAE 104 via signal conditioner 106, transport medium 110, signal conditioner 108, and communication connection 114. Yet another sector of BTS 102 may be connected via another antenna feed to another antenna or to another network entity connected to BTS 102 via the other antenna feed.

Antenna 122 radiates signals to form RF air interface 116. BTS 102 may include amplifier circuitry (not shown) for amplifying the signals provided to antenna feed 118 so that the signals propagated from antenna 122 are of sufficient power for a given sector or cell.

DAS 103 may be a part of the RAN that includes BTS 102. DAS 103 includes a RAE 104 and transport medium 110. DAS 103 may include one or more other remote antenna entities (not shown). Each of the other remote antenna entities of DAS 103 may perform communications using transport medium 110 and/or one or more other transport mediums (not shown). Each remote antenna entity may include amplifier circuitry for amplifying an RF signal to be provided to an antenna feed and in turn, an antenna for radiating the amplified signal over an RF air interface.

DAS 103 extends the cell and/or sector(s) (corresponding to BTS 102) by radiating signals away from RAE 104 and the other remote antenna entities. The signals radiated away from RAE 104 form an RF air interface 124 and are arranged according to the same air interface protocol as the air interface protocol for RF air interface 116. Similarly, signals radiated away from the other remote antenna entities form respective air interfaces arranged according to the same air interface protocol as the air interface protocol for RF air interface 116

RAE 104 may include (i) an antenna feed interface 125, (ii) circuitry 126 for connecting to communication connection 114 and to antenna feed interface 125, and (ii) an antenna feed 127 for connecting to an antenna 128. Circuitry 126 may include circuitry for providing signals between communication connection 114 and antenna feed 127.

RAE 104 may include one or more other antenna feeds that connect to one or more other antennas. In this regard, antenna feed interface 117 may be arranged with (i) an interface that connects to antenna feed 127 and that is designated for a given sector, and (ii) one or more other interfaces that connect to the one or more other antenna feeds and that is designated for one or more other sectors.

System 100 provides means for performing wireless communications with multiple wireless communication devices. As shown in FIG. 1, WCD 132 may use RF air interface 116 to communicate wirelessly with BTS 102, and a WCD 134 may use RF air interface 124 to communicate wirelessly with RAE 104. BTS 102 provides wireless service to both WCD 132 and WCD 134, however, the wireless service provided by BTS 102 to WCD 134 is carried out, in part, by DAS 103. One or more other wireless communication devices (not shown) may also perform wireless communications with BTS 102 and/or the remote antenna entities of DAS 103.

WCD 132 and WCD 134 may be arranged as any of a variety of wireless communication devices. In one respect, WCD 132 and/or WCD 134 may be arranged as a mobile WCD. For example, a mobile WCD may be arranged as a mobile phone, a wireless personal digital assistant (PDA), or a portable computer having a wireless network interface. Other examples of a mobile WCD are also possible.

In another respect, WCD 132 and/or WCD 134 may be arranged as a fixed WCD. A fixed WCD is a wireless device situated in a fixed location, such as an office or home. A fixed WCD typically derives electrical power from a utility source provided to the fixed location, as opposed to a mobile WCD that normally derives electrical power from a battery. As an example, a fixed WCD may be arranged as a wireless local loop hub that provides an interface between (i) conventional landline telephone equipment located at a fixed location, and (ii) the PSTN via the RAN that includes BTS 102. Other examples of a fixed WCD are also possible.

Signal conditioner 106 includes an interface to antenna feed 112 and an interface to transport medium 110. Signal conditioner 106 includes means for receiving signals from antenna feed 112 and for conditioning these received signals for subsequent transmission over transport medium 110. Signal conditioner 106 also provides means for receiving signals from transport medium 110 and for conditioning these received signals for subsequent transmission to BTS 102 via antenna feed 112. Additional details of signal conditioner 106 are described below with respect to FIG. 3.

Signal conditioner 108 includes (i) an interface to communication connection 114 that connects to a RAE 104, and (ii) an interface to transport medium 110. Signal conditioner 108 includes means for receiving signals from remote antenna entities (e.g., RAE 104) and for conditioning these received signals for subsequent transmission over transport medium 110. Signal conditioner 108 also provides means for receiving signals from transport medium 110 and for conditioning these received signals for subsequent transmission to remote antenna entities (e.g., RAE 104). Additional details of signal conditioner 108 are described below with respect to FIG. 4.

Transport medium 110 provides means for transporting a combined digital signal between signal conditioner 106 and signal conditioner 108. Transportation of the combined digital signal via transport medium 110 occurs by transporting the combined digital signal as information data over transport medium 110. The combined digital signal comprises the total information to be radiated from an antenna of BTS 102 (e.g., the total information to be radiated for one sector) or the total information to be transmitted from RAE 104 to BTS 102. As an example, the total information may include (i) the information associated with multiple phone calls and/or data sessions being handled by BTS 102, and (ii) control information.

The combined digital signal may be produced in BTS 102 by combining digital signals from multiple communication channels. BTS 102 produces the combined digital signal by combining digital signals from multiple forward-link channels, such as any combination of the forward-link channels described above. RAE 104 receives the RF signal over the air which contains signals for multiple reverse-link channels, such as any combination of the reverse-link channels described above. RAE 104 sends the RF signal to signal conditioner 108. Signal conditioner 108 recovers the combined digital signal by demodulating the RF signal, which contains signals for multiple reverse-link channels.

Transport medium 110 may be arranged in various configurations. In one respect, transport medium 110 may be arranged as a broadband wireline transport medium. As an example, a broadband wireline transport medium may be arranged as a coaxial cable transport medium, an optical fiber transport medium, a broadband over electrical power line transport medium, or a twisted pair of copper wires. As another example, a broadband wireline transport medium may be arranged as a transport medium in compliance with International Telecommunication Union—Telecommunications (ITU-T) recommendation G.993.2 entitled *Very-high-bit-rate Digital Subscriber Line* 2. Other examples of a broadband wireline transport medium are also possible.

In another respect, transport medium 110 may be arranged as a broadband wireless transport medium. As an example, a broadband wireless transport medium may be arranged as a transport medium using at least a portion (i.e., one or more frequencies) of a broadband radio spectrum (e.g., 2.495 GHz to 2.690 GHz), a free space optics transport medium, a millimeter wave transport medium, or a microwave radio transport medium. Other examples of a broadband wireless transport medium are also possible.

In yet another respect, transport medium 110 may be arranged as a shared transport medium for transporting (i) a combined digital signal between signal conditioner 106 and signal conditioner 108, and (ii) other data traffic to be transmitted to a destination without passing the data traffic through BTS 102 or RAE 104. In this description, data traffic, transported over transport medium 100, that includes a combined digital signal and other data traffic is referred to as combined data traffic.

A variety of data traffic may be transmitted as combined data traffic via transport medium 110. As an example, data traffic may include data being transmitted over Ethernet in accordance with the Institute of Electrical and Electronic Engineers (IEEE) 802.3 standards. As another example, data traffic may include data being transmitted over a Synchronous Optical NETwork (SONET). Other examples of data traffic that may be transmitted over transport medium 110 are also possible.

Antenna feed 112 provides a communication path between BTS 102 and signal conditioner 106. Multiple antenna feeds, each connected to a different sector of BTS 102, may provide communication paths for transporting signals between BTS 102 and signal conditioner 106.

FIG. 2A depicts transport medium 110 arranged as a shared transport medium carrying traffic from signal conditioner 106 towards signal conditioner 108. As shown in FIG. 2A, signal conditioner 106 receives an RF combined digital signal (CDS) 200 (from BTS 102) and outputs a conditioned CDS 202. The conditioned CDS 202 and other data traffic 204 are carried over the shared transport medium 110 as combined data traffic 206.

Depending on the specific transport medium utilized, the conditioned CDS 202 and the other data traffic 204 may be combined to form combined data traffic 206 or they may be carried independently over independent carriers on transport medium 110. The combined data traffic 206 may be formed at signal conditioner 106 or by a means remote from signal conditioner 106. As an example, the means remote from signal conditioner 106 may include a network server operated by a service provider that operates transport medium 110. In the case, where signal conditioner 106 forms the combined digital signal 206, the other data traffic 204 may be provided directly to signal conditioner 106.

Various methods may be used to combine the conditioned CDS 202 and the other data traffic 204 so as to form the combined data traffic 206. For example, the combined data traffic 206 may be formed by modulating the combined digital signal recovered from the RF CDS 200 onto a first set of sub-carriers or carriers and modulating the other data traffic 204 onto a second set of sub-carriers or carriers. As another example, the conditioned CDS 202 and the other data traffic 204 may be combined onto a single carrier, such as a millimeter wave band carrier.

The modulation of the combined digital signal recovered from the RF CDS 200, the conditioned CDS 202, and the other data traffic 204 may be carried out using any of a variety of modulation techniques, such as BPSK (Binary Phase Shift Keying), QPSK (Quadrature Phase Shift Keying), or QAM (Quadrature Amplitude Modulation). Other examples of the various modulation techniques for modulating the combined digital signal recovered from the RF CDS 200, the conditioned CDS 202, and the other data traffic 204 are also possible.

As another example, the combined data traffic 206 may be transported over the shared transport medium 110 as Ethernet packets. For example, the conditioned CDS 202 may comprise the CDS recovered from the RF CDS 200, encapsulated as the payload of Ethernet packets, with a destination address of signal conditioner 108, and a source address of the signal conditioner 106 that forms the Ethernet packets. The other data traffic 204 is transported as the payload of other Ethernet packets, with other destination and source addresses.

The conditioned CDS 202 and the other data traffic 204 may be interleaved using any of a variety of interleaving techniques such as packet interleaving. Other examples of the various interleaving techniques for combining the conditioned CDS 202 and the other data traffic 204 are also possible.

The conditioned CDS 202 and the other data traffic 204 may be multiplexed using any variety of multiplexing techniques such as Frequency Division Duplexing (FDD), or Time Division Multiplexing (TDM). Other examples of multiplexing the conditioned CDS 202 and the other data traffic 204 are also possible.

Transmission of the combined data traffic 206 through transport medium 110 allows for simultaneous transmission of the conditioned CDS 202 and the other data traffic 204 through the shared transport medium 110.

FIG. 2A also depicts the combined data traffic 206 being separated to recover the conditioned CDS 202 and the other data traffic 204 after the combined data traffic 206 has passed through transport medium 110. The conditioned CDS 202 is separated from the combined data traffic 206 and then provided to signal conditioner 108. The other traffic data 204 is separated from the combined data traffic 206 and may be provided to a network for delivery to an entity other than BTS 102 or DAS 103.

The separation of the combined data traffic 206 to obtain the conditioned CDS 202 and the other traffic data 204 may be carried out in signal conditioner 108. Alternatively, the separation of the combined data traffic 206 to obtain the conditioned CDS 202 and the other traffic data 204 may be carried out at a means remote from signal conditioner 108.

FIG. 2B depicts transport medium 110 arranged as a shared transport medium carrying traffic from signal conditioner 108 towards signal conditioner 106. As shown in FIG. 2B, signal conditioner 108 receives an RF CDS 210 (from RAE 104) and outputs a conditioned CDS 212. The conditioned CDS 212 and other data traffic 214 are carried over the shared transport medium 110 as combined data traffic 216.

Depending on the specific transport medium utilized, the conditioned CDS 212 and the other data traffic 214 may be combined to form combined data traffic 216 or they may be carried independently over independent carriers on transport medium 110. The combined data traffic 216 may be formed at signal conditioner 108 or by a means remote from signal conditioner 108. As an example, the means remote from signal conditioner 108 may include a network server operated by a service provider that operates transport medium 110. In the case, where signal conditioner 108 forms the combined digital signal 216, the other data traffic 214 may be provided directly to signal conditioner 108.

The methods and means described herein for combining the conditioned CDS 202 and the other data traffic 204 may also be used to combine the conditioned CDS 212 and the other data traffic 214. Similarly, the method and means described herein for transporting the combined data traffic 206 over transport medium 110 may also be used for transporting the combined data traffic 216 over transport medium 110.

FIG. 2B also depicts the combined data traffic 216 being separated to recover the conditioned CDS 212 and the other data traffic 214 after the combined data traffic 216 has passed through transport medium 110. The conditioned CDS 212 is separated from the combined data traffic 216 and is provided to signal conditioner 106. The other traffic data 214 is separated from the combined data traffic 216 may be provided to a network for delivery to an entity other than BTS 102 or DAS 103.

The separation of the combined data traffic 216 to obtain the conditioned CDS 212 and the other traffic data 214 may be carried out in signal conditioner 106. Alternatively, the separation of the combined data traffic 216 to obtain the conditioned CDS 212 and the other traffic data 214 may be carried out at a means remote from signal conditioner 106.

Figure 3:
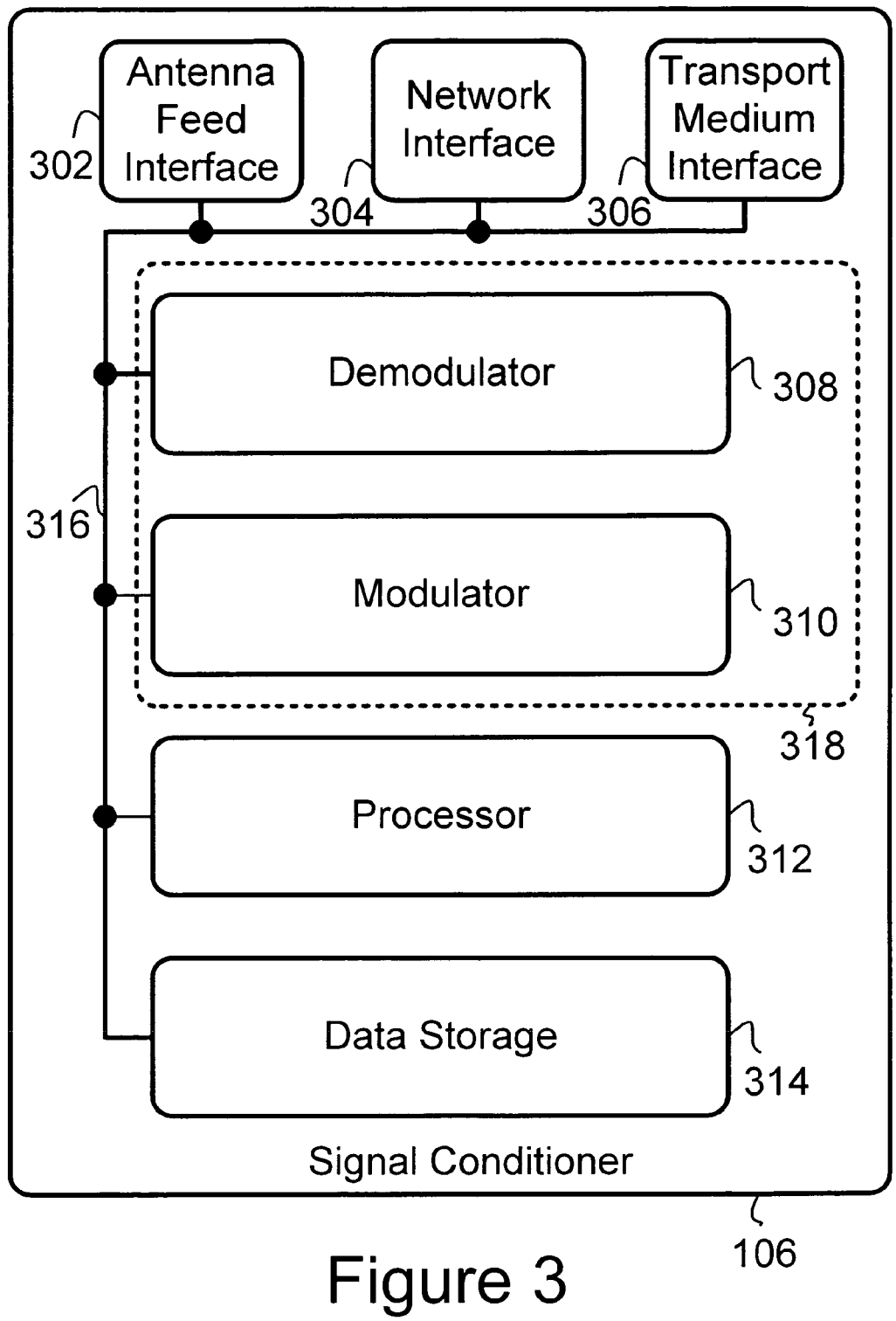
FIGS. 3 and 4 are block diagrams depicting details of exemplary signal conditioners.

Next, FIG. 3 depicts details of signal conditioner 106 which interfaces to BTS 102. As shown in FIG. 3, signal conditioner 106 may include an antenna feed interface 302 that interfaces to BTS 102 via antenna feed 112, a network interface 304, a transport medium interface 306, a demodulator 308, a modulator 310, a processor 312, and data storage 314, all linked together via a system bus, network, or other connection mechanism 316.

One or more of the components of signal conditioner 106 may be combined. For example, demodulator 308 and modulator 310 may be combined as a single entity, i.e., a modem 318. Moreover, one or more of the components of signal conditioner 106 may be omitted.

Antenna feed interface 302 may receive a signal representing a combined digital signal. For example, antenna feed interface 302 may receive the RF CDS 200 sent over antenna feed interface 112 from BTS 102. BTS 102 may include a modulator to produce the RF CDS 200 by modulating an RF carrier with a combined digital signal produced at BTS 102.

Network interface 304 interfaces with one or more networks. These one or more networks may include one or more wireless networks and/or one or more wireline networks. Network interface 304 interfaces to the one or more networks by receiving data traffic (e.g., the other data traffic 204) from the one or more networks and/or by providing data traffic (e.g., the other data traffic 214) to the one or more networks. Signal conditioner 106 may not include network interface 304 if the conditioned CDS 202 and the other data traffic 204 are combined and separated at an entity remote from signal conditioner 106.

Network interface 304 may interface with various types of wireless networks or wireline networks. For example, network interface 304 may interface with a wireline network including a twisted pair of cables configured for performing Ethernet communications. As another example, network interface may interface with an optical fiber network arranged as a SONET. As yet another example, network interface 304 may interface with a wireline network including a Hybrid Fiber-Coax (HFC) for performing communications in accordance with the Data Over Cable Service Interface Specifications (DOCSIS), or in accordance with another specification or protocol. Other examples of the various types of networks network interface 304 may interface with are also possible.

Transport medium interface 306 interfaces with transport medium 110. Transport medium interface 306 may interface with transport medium 110 by providing data to transport medium 110. As an example, transport medium interface 306 may provide the conditioned CDS 202 and the other data traffic 204 to transport medium 110 for transmission, in turn, to signal conditioner 108. As another example, transport medium interface 306 may provide the combined data traffic 206 to transport medium 110 for transmission, in turn, to signal conditioner 108.

Transport medium interface 306 may also interface with transport medium 110 by receiving data from transport medium 110. As an example, transport medium interface 306 may receive the conditioned CDS 212 and the other data traffic 214 sent from signal conditioner 108 via transport medium 110. As another example, transport medium interface 306 may receive the combined data traffic 216 sent from signal conditioner 108 via transport medium 110.

Transport medium interface 306 may include multiple transport medium interfaces for interfacing to multiple transport media. For example, transport medium interface 306 may include (i) one or more transport medium interfaces interfacing to a corresponding broadband wireline transport medium, and/or (ii) one or more transport medium interfaces interfacing to a corresponding broadband wireless transport medium.

Moreover, each of the multiple transport medium interfaces may be arranged as an interface card pluggable into and removable from a backplane. The backplane may be arranged for holding the transport media interfaces while the interfaces are operational. The arrangement of using pluggable and removable interface cards is advantageous for at least the reason that an entity operating the pluggable and removable interface cards may switch transport media interfaces at a preferred time. As an example, the preferred time to switch transport media interfaces may be when a particular transport medium interface stops functioning. As another example, the preferred time to switch transport medium interfaces may be after the entity enters into an agreement with another entity operating a new transport medium.

Demodulator 308 may comprise one or more demodulators for conditioning signals by demodulating the signals. For example, demodulator 308 may include a first demodulator for demodulating signals received at antenna feed interface 302, a second demodulator for demodulating signals received at network interface 304, and a third demodulator for demodulating signals received from transport medium interface 306. Depending on the transport medium deployed, demodulation of signals or data streams received at network interface 304 or transport medium interface 306 may not be necessary. Instead, those signals or data streams may receive a different treatment (e.g., conditioning) as appropriate.

Demodulator 308 (e.g., the first demodulator) may receive the RF CDS 200 from antenna feed interface 302. Demodulator 308 may demodulate the RF CDS 200 so as to recover the combined digital signal and then provide the recovered combined digital signal to another conditioning device of signal conditioner 106. For example, demodulator 308 may provide the recovered combined digital signal to modulator 310 or to processor 312.

Demodulator 308 may demodulate other signals as well, such as a signal received at network interface 304 or transport medium interface 306. Demodulator 308 may demodulate each signal received at demodulator 308 so as to recover (e.g., extract) a combined digital signal or the other data traffic 204 represented by the received signal. After recovering the combined digital signal, demodulator 308 may provide the recovered combined digital signal or the other data traffic 204 to another portion of signal conditioner 106.

Modulator 310 may comprise one or more modulators that each modulate a given carrier with a respective signal. Modulator 310 may receive the signals to modulate the given carriers from other portions of signal conditioner 106 (e.g., demodulator 308 or processor 312). As an example, modulator 310 may (i) receive a combined digital signal recovered from RF CDS 200 by demodulator 308, and (ii) modulate a carrier with the combined digital signal so as to produce a signal representing the combined digital signal. This signal may comprise conditioned CDS 202.

The one or more modulators of modulator 310 may be arranged in various configurations to condition signals. For example, modulator 310 may include a modulator for modulating signals to be transmitted to network interface 304 or to transport medium interface 306. In this regard, modulator 310 may modulate a carrier in accordance with any of a variety of modulation schemes. For example, modulator 310 may modulate the carrier in accordance with the Binary Phase Shift Keying (BPSK), the Quadrature Phase Shift Keying (QPSK), the 16-state Quadrature Amplitude Modulation (16QAM), or the 256-state Quadrature Amplitude Modulation (256QAM), or any other modulation scheme now known or later developed.

As another example, modulator 310 may include a modulator for modulating signals to be sent to antenna feed interface 302 and, in turn, antenna feed 112. For instance, this modulator may modulate signals in accordance with the CDMA, TDMA, OFDMA, or some other air interface protocol used by BTS 102.

In accordance with exemplary embodiments in which demodulator 308 and modulator 310 are combined as modem 318, any of a variety of modems known to those of skill in the art may be used to carry out at least a portion of the demodulation and modulation performed by signal conditioner 300. For example, modem 318 may comprise a modem within a chipset identified as Mobile Station Modem™ (MSM™) and manufactured by Qualcomm, Inc. of San Diego, Calif. Qualcomm, Inc. manufactures a variety of MSM™ chipsets such as the MSM6800 chipset that supports CDMA2000 1X, CDMA2000 1XEV-DO, and GSM/GPRS networks. An advantage of using an MSM™ chipset as modem 318 is that the MSM™ chipset is already available for use to perform at least a portion of the demodulation and modulation performed by signal conditioner 300. Other examples of modem 318 are also possible.

Processor 312 may comprise one or more processors (e.g., one or more general purpose processors and/or one or more digital signal processors). Processor 312 may execute program instructions stored in data storage 314 and/or in firmware. In response to executing the program instructions, processor 312 may interact with antenna feed interface 302, network interface 304, transport medium interface 306, demodulator 308, and/or modulator 310 so as to carry out conditioning of signals and other functions described herein. As an example, processor 312 may (i) receive a combined digital signal recovered from RF CDS 200 by demodulator 308, and (ii) condition the combined digital signal by encapsulating it as the payload in Ethernet packets. These packets may comprise conditioned CDS 202.

Data storage 314 comprises a computer readable medium. A computer readable medium may comprise volatile and/or non-volatile storage components, such as optical, magnetic, organic or other memory or disc storage, which can be integrated in whole or in part with processor 312.

Various program instructions may be stored in data storage 314 and/or in firmware. As an example, the program instructions may include instructions executable by processor 312 to cause transport medium interface 306 to provide the conditioned CDS 202 and/or the other data traffic 204 to transport medium 110. As another example, the program instructions may include instructions for communicating to RAE 104 data that indicates (i) a first frequency for transmitting an RF combined digital signal over the air from an antenna, and (ii) a second frequency for the antenna to receive RF signals transmitted over the air.

As yet another example, the program instructions may include instructions that cause processor 312 to select (for use) a particular transport medium interface, from among multiple transport medium interfaces of transport medium interface 306 that interface with transport medium 110. For instance, these program instructions may include instructions for responding to a message, received from a remote device (e.g., a remote signal conditioner or another network entity), that indicates the particular transport medium interface should be selected. The remote device may send the message in response to detecting that a previously selected transport medium has failed (e.g., not performing communications). Other examples of program instructions storable in data storage 314 or in firmware are also possible.

Figure 4:
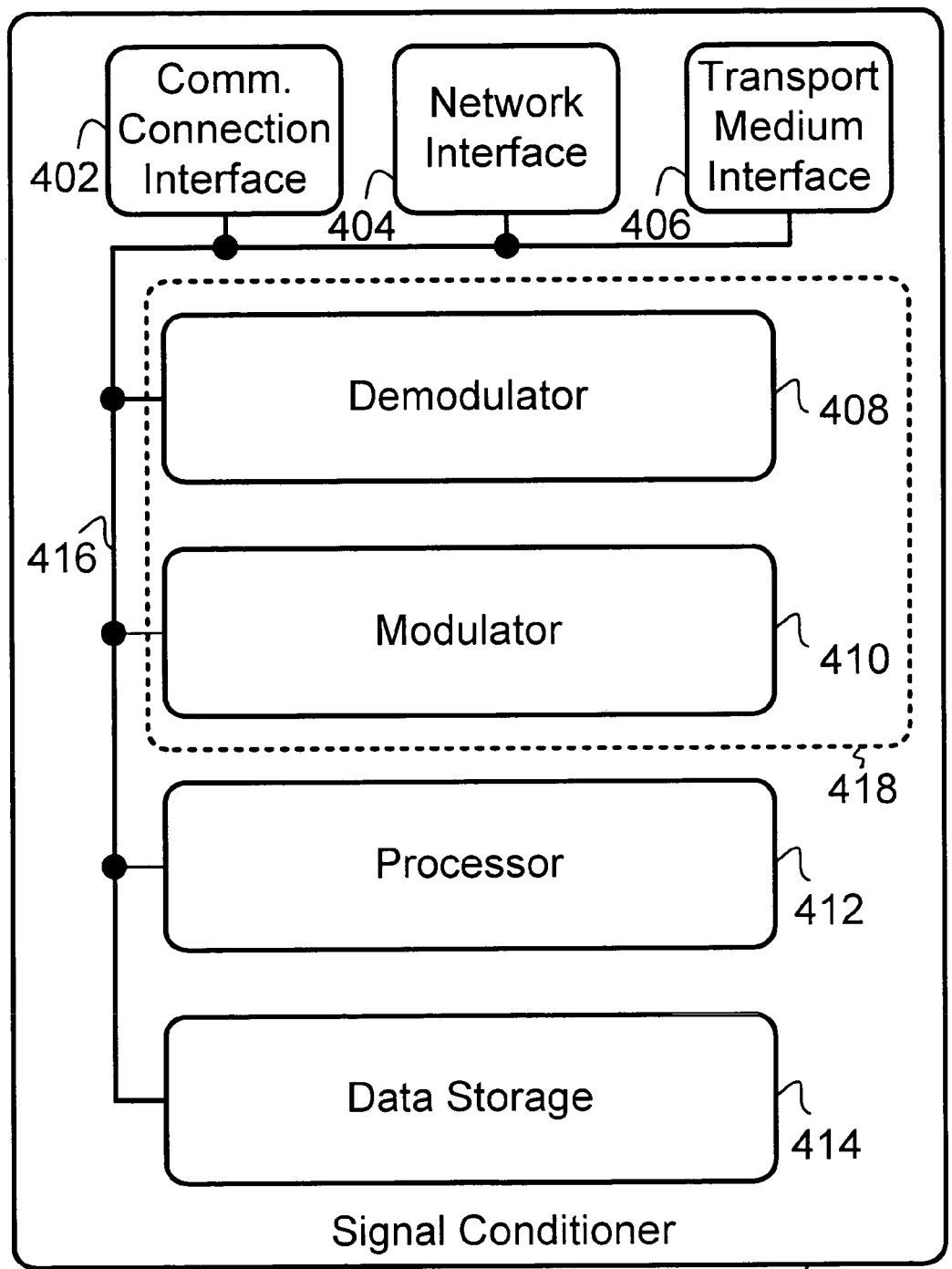

Next, FIG. 4 depicts details of signal conditioner 108 which interfaces to RAE 104. As shown in FIG. 4, signal conditioner 108 includes a communication connection interface 402 that interfaces to communication connection 114 (and, in turn, to RAE 104 via communication connection 114), a network interface 404, a transport medium interface 406, a demodulator 408, a modulator 410, a processor 412, and data storage 414, all linked together via a system bus, network, or other connection mechanism 416.

One or more of the components of signal conditioner 108 may be combined. For example, demodulator 408 and modulator 410 may be combined as a single entity, i.e., a modem 418. Moreover, one or more of the components of signal conditioner 108 may be omitted.

One or more of the components of signal conditioner 108 may be identical to components in signal conditioner 106. However the interface components of signal conditioner 106 and the interface components of signal conditioner 108 may interface to different entities or at different locations of a common entity. For example, communication connection interface 402 connects to RAE 104 via communication connection 114, whereas, antenna feed interface 302 connects to BTS 102 via antenna feed 112. As another example, network interface 304 may interface to a first data transport network and network interface 404 may interface to a second data transport network. As yet another example, transport medium interface 306 interfaces to transport medium 110 at a first location and transport medium interface 406 interfaces to transport medium interface 110 as a second location.

Demodulator 408 may comprise one or more demodulators for conditioning signals by demodulating the signals. For example, demodulator 408 may include a first demodulator for demodulating signals received at communication connection interface 402, a second demodulator for demodulating signals received at network interface 404, and a third demodulator for demodulating signals received from transport medium interface 406.

Demodulator 408 may receive the RF CDS 210 from communication connection interface 402. Demodulator 408 may demodulate the RF CDS 210 so as to recover the combined digital signal and then provide the recovered combined digital signal to another conditioning device of signal conditioner 108. For example, demodulator 408 may provide the recovered combined digital signal to modulator 410 or to processor 412.

Demodulator 408 may demodulate other signals as well, such as a signal received at network interface 404 or transport medium interface 406. Demodulator 408 may demodulate each signal received at demodulator 408 so as to recover (e.g., extract) a combined digital signal or the other data traffic 214 represented by the received signal. After recovering the combined digital signal, demodulator 408 may provide the recovered combined digital signal or the other data traffic 214 to another portion of signal conditioner 108.

Modulator 410 may include one or more modulators for modulating carrier signals. For example, modulator 410 may include a first modulator for modulating a first carrier to be sent via communication connection interface 402, a second modulator for modulating a second carrier to be sent via network interface 404, and a third modulator for modulating a third carrier to be sent via transport medium interface 406. In this way, modulator 410 may modulate an RF carrier with a combined digital signal so as to produce an RF signal representing the combined digital signal. This RF carrier modulated by modulator 410 is typically a carrier having a frequency substantially identical to the frequency of an RF carrier modulated at BTS 102 to produce the RF signal provided to signal conditioner 106 via antenna feed 112.

Processor 412 may execute program instructions stored in firmware or in data storage 414. The program instructions executed by processor 412 are similar to the instructions executed by processor 312 except that the instructions executed by processor 412 are for communicating data from signal conditioner 108 to RAE 104 or from signal conditioner 108 towards BTS 102 via transport medium 110.

In one embodiment, as described above, signal conditioner 108 may be physically separate from RAE 104. In another embodiment, signal conditioner 108, communication connection 114, and RAE 104 may be integrated (e.g., combined) into a signal conditioning remote antenna entity that connects directly to transport medium 110. The signal conditioning remote antenna entity may include one or more antenna feeds for connecting to one or more antennas.

3. Exemplary Operation a. Data Communications—BTS to DAS

Figure 5:
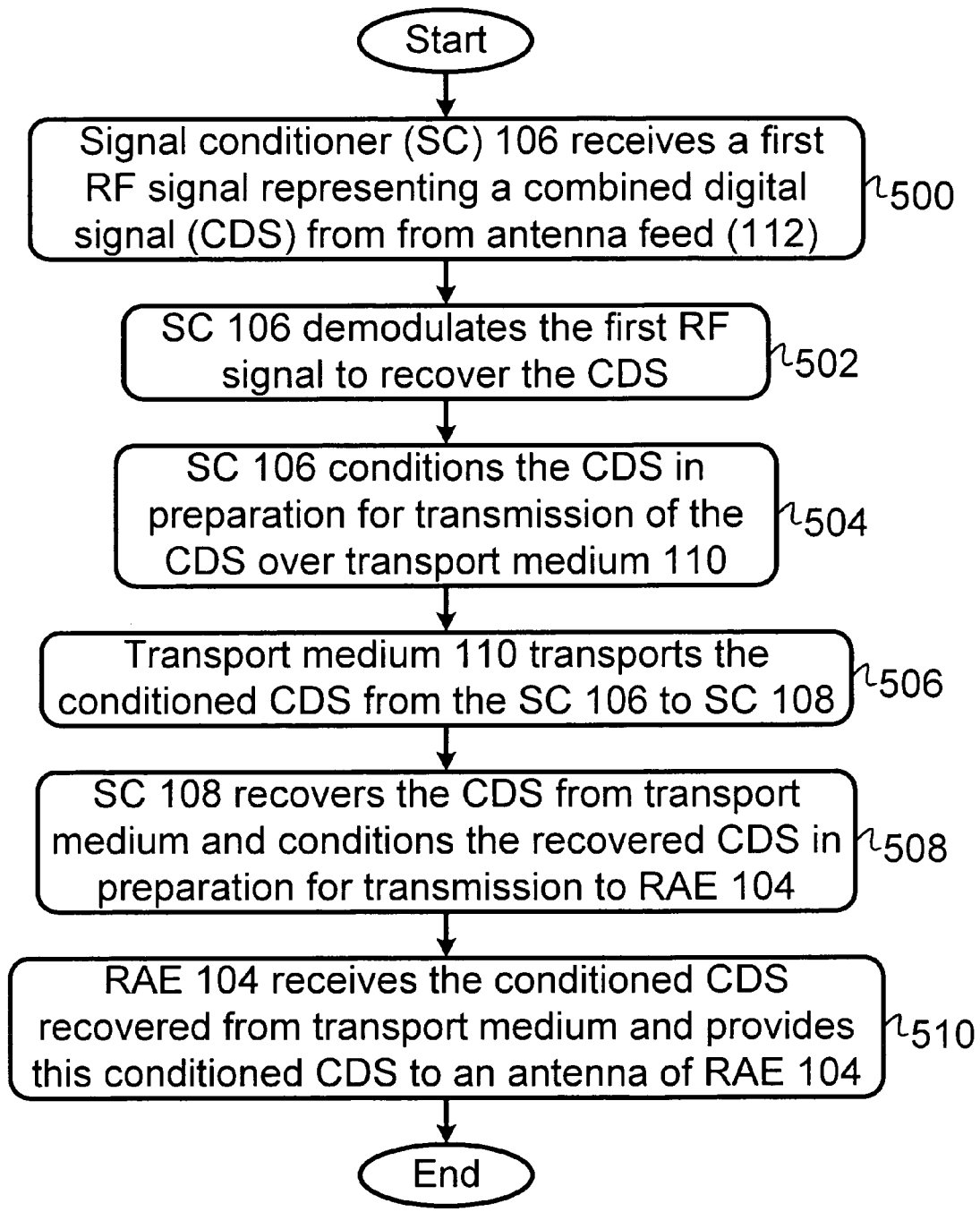
FIG. 5 is a flow chart depicting a set of functions that can be carried out in accordance with an exemplary embodiment for use in communicating data from a base transceiver station to a remote antenna entity.

FIG. 5 is a flow chart provided to illustrate some of the functions that may be carried out in accordance with exemplary embodiments of the present invention. The functions shown in FIG. 5 are for use in performing communications from BTS 102 to RAE 104 of DAS 103, as well as other remote antenna entities of DAS 103.

As shown in FIG. 5, at block 500, signal conditioner 106 receives a first RF signal representing a combined digital signal (e.g., RF CDS 200). Signal conditioner 106 receives the RF CDS 200 via antenna feed 112. BTS 102 produces the first combined digital signal and the RF CDS 200.

BTS 102 produces the combined digital signal by combining digital signals from multiple communication channels and control channels. The multiple communication channels and control channels may be forward-link channels in accordance with any air interface protocol. For example, the multiple communication channels and control channels may include forward-link channels in accordance with the CDMA air interface protocol, the TDMA air interface protocol, or the OFDMA air interface protocol. Other examples of the multiple communication channels and control channels are also possible.

BTS 102 may produce the RF CDS 200 by modulating a first carrier with the combined digital signal. In particular, the first carrier may comprise an RF carrier such that the RF CDS 200 is an RF signal suitable for transmission to antenna feed 118 for subsequent transmission from antenna 122. In this regard, the RF CDS 200 may include an RF signal representing a combined digital signal in accordance with the CDMA air interface protocol, the TDMA air interface protocol, the OFDMA air interface protocol, or some other air interface protocol.

Signal conditioner 106 receives the RF CDS 200 at antenna feed interface 302. In response to receiving the RF CDS 200, antenna feed interface 302 provides the RF CDS 200 to demodulator 308 via connection mechanism 316.

Next, at block 502, signal conditioner 106 demodulates the RF CDS 200 so as to recover the combined digital signal. Demodulation of the RF CDS 200 may be carried out by demodulator 308 (e.g., a first demodulator that connects to antenna feed interface 302). After recovering the combined digital signal, demodulator 308 may provide the recovered combined digital signal to another conditioning device of signal conditioner 106, such as the modulator 310 or the processor 312.

Next, at block 504, signal conditioner 106 conditions the combined digital signal in preparation for transmission of the combined digital signal over transport medium 110. Conditioning the combined digital signal may include conditioning the signal for transmission over various types of transport media (e.g., a wireless transport medium or a wireline transport medium). Conditioning the combined digital signal results in production of a conditioned combined digital signal (e.g., conditioned CDS 202).

In one respect, modulator 310 may carry out at least a portion of the conditioning of the combined digital signal. For example, modulator 310 may modulate a second carrier with the recovered combined digital signal so as to produce the conditioned CDS 202. The second carrier may include an RF carrier such that the conditioned CDS 202 is an RF modulated signal. After producing the conditioned CDS 202, modulator 310 may provide the conditioned CDS 202 to transport medium interface 306 or to processor 312, via connection mechanism 316.

In another respect, processor 312 may execute program instructions to carry out at least a portion of the conditioning of the combined digital signal. Processor 312 may (i) receive the conditioned CDS 202 from modulator 310 and perform additional conditioning to the conditioned CDS 202, or (ii) receive the combined digital signal directly from demodulator 308 and perform conditioning to the combined digital signal.

Processor 312 may carry out conditioning of the combined CDS 202 or the combined digital signal in various ways. As an example, processor 312 may execute program instructions to carry out combining the conditioned CDS 202 with the other data traffic 204 received at network interface 304 so as to produce the combined data traffic 206. As another example, processor 312 may execute program instructions to condition the combined digital signal by interleaving or multiplexing the combined digital signal with the other data traffic 204. As yet another example, processor 312 may execute program instructions to condition the combined digital signal by placing the combined digital signal, alone or in combination with the other data traffic 204, into packets such as Ethernet packets as specified by IEEE 802.3 standards. Other examples of processor 312 executing program instructions to carry out conditioning of the conditioned CDS 202 or the combined digital signal are also possible.

After conditioning the combined digital signal (recovered from the RF CDS 200) to produce the conditioned CDS 202, signal conditioner 106 provides the conditioned CDS 202 to transport medium interface 306 for subsequent transmission of the conditioned CDS 202 over transport medium 110. Alternatively, if signal conditioner 106 combines the combined digital signal recovered from the RF CDS 200 or the conditioned CDS 202, with the other data traffic 204 to form the combined data traffic 206, then signal conditioner 106 may provide the combined digital signal to transport medium 110 by providing the combined data traffic 206 to transport medium 110.

Next, at block 506, transport medium 110 transports the conditioned CDS 202 from signal conditioner 106 to signal conditioner 108 or to multiple signal conditioners which interface to remote antenna entities of DAS 103. In one respect, transmission of the conditioned CDS 202 over transport medium 110 may be carried out via a single transport medium capable of transporting the conditioned CDS 202. For example, the conditioned CDS 202 may be transmitted over a broadband wireline transport medium or a broadband wireless transport medium.

In another respect, transmission of the conditioned CDS 202 over transport medium 110 may be carried out via transport media capable of transporting the conditioned CDS 202. As an example, the conditioned CDS 202 may be transmitted over transport media comprising a broadband wireline transport medium and a broadband wireless transport medium. The entire conditioned CDS 202 may be transmitted over both the broadband wireline transport medium and the broadband wireless transport medium substantially simultaneously. Alternatively, a first portion of the conditioned CDS 202 may be transmitted over the broadband wireline transport medium and a second portion of the conditioned CDS 202 may be transmitted over the broadband wireless transport medium.

In yet another respect, transport medium 110 may function as a shared transport medium so as to transport the conditioned CDS 202 and the other data traffic 204 over transport medium 110. In this regard, transport medium 110 may transport the conditioned CDS 202 and the other data traffic 204 individually or as combined data traffic 206.

Signal conditioner 106 or another entity may combine the conditioned CDS 202 and the other data traffic 204 to form the combined data traffic 206. For example, processor 312 may execute program instructions to carry out forming the combined data traffic 206 from the conditioned CDS 202 and the other data traffic 204. As another example, a network server remote from signal conditioner 106 may combine the conditioned CDS 202 and the other data traffic 204 to provide the combined data traffic 206. After formation of the combined data traffic 206, processor 312 (or the network server) may provide the combined data traffic 206 to transport medium interface 306 for subsequent transmission over transport medium 110.

Signal conditioner 108 may receive the conditioned CDS 202 separately or within the combined data traffic 206 that includes the conditioned CDS 202 and the other data traffic 204. Signal conditioner 108 receives the conditioned CDS 202 at transport medium interface 406.

Next, at block 508, signal conditioner 108 recovers the conditioned CDS 202 transported over transport medium 110 and subsequently conditions the recovered CDS in preparation for transmission of the recovered CDS to the RAE 104.

Signal conditioner 108 recovers the CDS from the conditioned CDS 202 using a method appropriate for how the conditioned CDS 202 is transported across transport medium 110. For example, if conditioned CDS 202 is transported across transport medium 110 as a modulated signal, the conditioned CDS 202 may be sent to demodulator 408. In this way, demodulator 408 can demodulate the conditioned signal 202 so as to recover the conditioned digital signal.

In the case when the conditioned CDS 202 is transported across transport medium 110 as combined data traffic 206, various methods may be used to recover the conditioned CDS 202. For example, signal conditioner 108 may receive the combined data traffic 206 at transport medium interface 406 and responsively provide the combined data traffic 206 to processor 412. In this way, processor 412 may execute program instructions to (i) separate the combined data traffic 206 to recover the conditioned CDS 202 and the other data traffic 204, (ii) condition the recovered conditioned CDS 202, (e.g., by providing the conditioned CDS 202 to demodulator 408 if the conditioned CDS 202 is modulated), or perform other conditioning methods if the conditioned CDS 202 is packetized, and (iii) provide the other data traffic 204 to network interface 404. After receiving the other data traffic 204 recovered from the combined data traffic 206, network interface 404 may transmit the other data traffic 204 to its destination via a network interfacing to network interface 404. Signal conditioner 108 may not include network interface 404 if the conditioned CDS 212 and the other data traffic 214 are combined and separated at an entity remote from signal conditioner 108.

As another example, a network entity located between transport medium 110 and signal conditioner 108 may receive the combined data traffic 206, separate the combined data traffic 206 to recover the conditioned CDS 202 and the other data traffic 204, provide the conditioned CDS 202 to signal conditioner 108, and provide the other data traffic 204 to a network that interfaces to this network entity. In accordance, with this example, signal conditioner 108 may receive the conditioned CDS 202 and use demodulator 408 and/or processor 412 to condition the conditioned CDS 202 as described above.

Signal conditioner 108 may provide the conditioned CDS 202 to modulator 410. Modulator 410 modulates an RF carrier with the conditioned CDS 202, recovered at signal conditioner 108, so as to produce an RF signal representing the combined digital signal (e.g., RF CDS 208). As an example, modulator 410 may perform modulation in accordance with the CDMA protocol. In this regard, the RF CDS 208 may be arranged as a CDMA RF signal. Other examples of the modulation performed to produce the RF CDS 208, such as TDMA modulation or OFDMA modulation are also possible.

An output of modulator 410 transmits the RF CDS 208 to communication connection interface 402. Communication connection interface 402 transmits the RF CDS 208 to RAE 104 via communication connection 114.

Next, at block 510, RAE 104 receives the combined digital signal as conditioned at signal conditioner 108 (i.e., RAE 104 may receive the RF CDS 208). RAE 104 receives the RF CDS 208 from signal conditioner 108 via communication connection 114. RAE 104 may provide the RF CDS 208 directly to antenna feed 127 for propagating the RF CDS 208 away from antenna 128.

Alternatively, RAE 104 may receive the combined digital signal arranged as the conditioned CDS 202 and perform additional conditioning to the conditioned CDS 202 so as to produce the RF CDS 208. RAE 104 may then provide the RF CDS 208 to antenna feed 127 for transmitting of the RF CDS 208 from antenna 128. RAE 104 may perform additional conditioning of the conditioned CDS 202 to produce the RF CDS 208. As an example, RAE 104 may condition the conditioned CDS 202 by modulating an RF carrier with the conditioned CDS 202 so as to form the RF CDS 208. In this regard, the RF carrier modulated at the RAE 104 may be substantially identical to the RF carrier modulated at BTS 102 to form RF CDS 200. As another example, RAE 104 may amplify the RF CDS 208 to produce an RF signal suitable for transmitting via antenna 128.

After performing additional conditioning of the conditioned CDS 202 to form the RF CDS 208, or after receiving the RF CDS 208, RAE 104 may provide the RF CDS 208 to antenna feed 127. Antenna feed 127 provides means for transporting the RF CDS 208 to antenna 128. Antenna 128 provides means for propagating the RF CDS 208 away from RAE 104. Since RF CDS 208 represents the combined digital signal produced at BTS 102, propagating the RF CDS 208 away from RAE 104 extends the range of BTS 102. Propagating the RF CDS 208 away from RAE 104 extends the range of BTS 102 because the combined digital signal is propagated over air interface 124 which provides wireless service in an area different than air interface 116.

In accordance with the exemplary embodiment in which signal conditioner 108 is integrated with RAE 104 to form a signal conditioning remote antenna entity, blocks 508 and 510 may be combined such that the signal conditioning remote antenna entity (i) receives the combined digital signal (e.g., in the form of the conditioned CDS 202 or the combined data traffic 206) from transport medium 110, and (ii) conditions the combined digital signal to form RF CDS 208 to be propagated from an antenna connected to the signal conditioning remote antenna entity. The signal conditioning remote antenna entity may then propagate the RF CDS 208 from antenna 128 or from antenna 128 and one or more other antennas.

b. Data Communications—DAS to BTS

Figure 6:
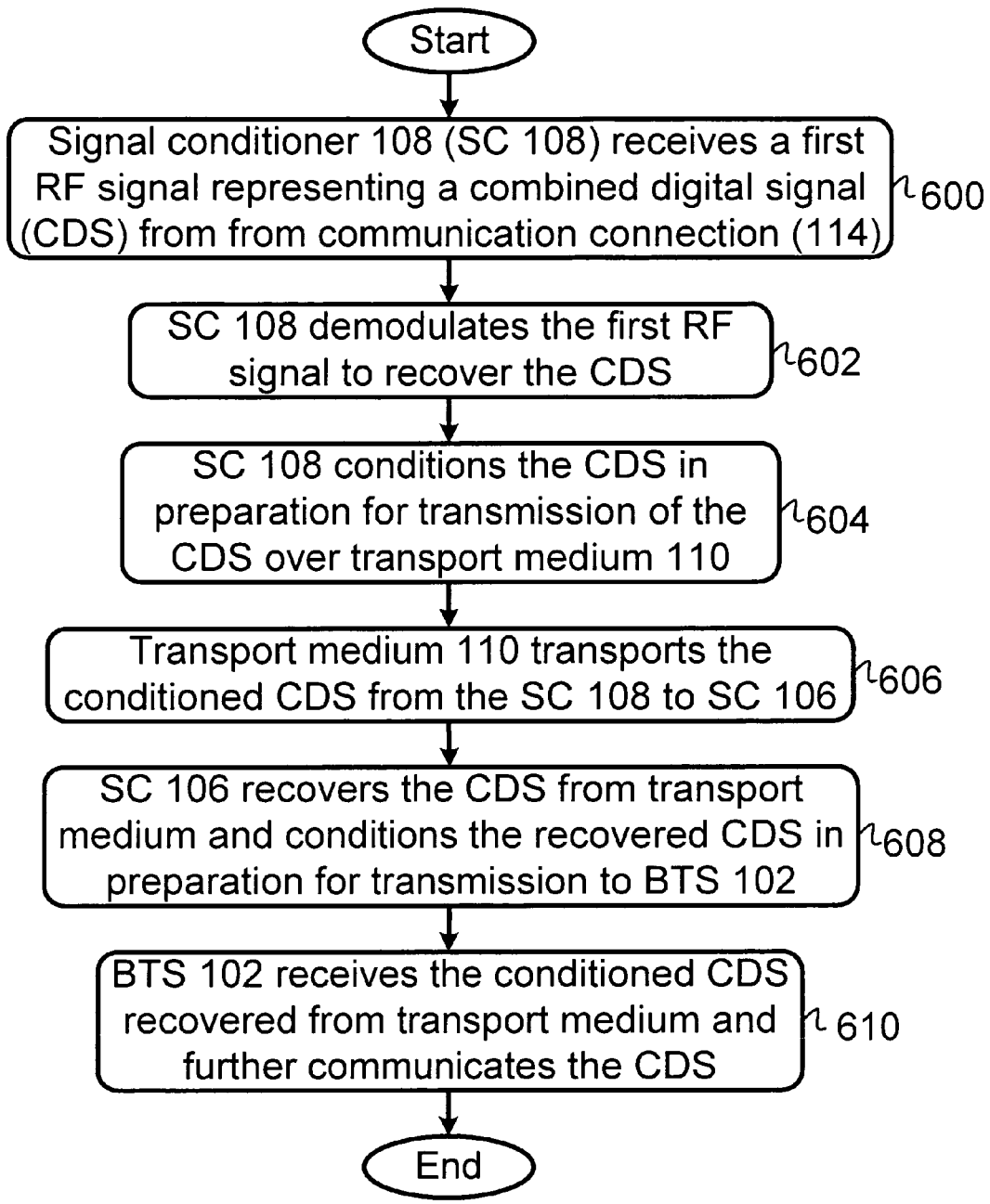
FIG. 6 is a flow chart depicting a set of functions that can be carried out in accordance with an exemplary embodiment for use in communicating data from a remote antenna entity to a base transceiver station.

FIG. 6 is a flow chart provided to illustrate some of the functions that may be carried out in accordance with exemplary embodiments of the present invention. The functions shown in FIG. 6 are described below as functions for performing communications in a direction from RAE 104 to BTS 102.

As shown in FIG. 6, at block 600, signal conditioner 108 receives an RF signal representing a combined digital signal (e.g., RF CDS 210). Signal conditioner 108 receives the RF CDS 210 from RAE 104 via communication connection 114. RAE 104 receives RF CDS 210 from antenna 128, which receives the signal over RF air interface 124.

RF CDS 210 includes multiple communication channels and control channels. The multiple communication channels and control channels may be reverse-link channels in accordance with any air interface protocol. For example, the multiple communication channels and control channels may include reverse-link channels in accordance with the CDMA air interface protocol, the TDMA air interface protocol, or the OFDMA air interface protocol. Other examples of the multiple communication channels and control channels are also possible.

Signal conditioner 108 receives the RF CDS 210 at communication connection interface 402. In response to receiving the RF CDS 210, communication connection interface 402 provides the RF CDS 210 to demodulator 408 via connection mechanism 416.

Next, at block 602, signal conditioner 108 demodulates the RF CDS 210 so as to recover the combined digital signal from the RF CDS 210 provided by RAE 104. Demodulation of the RF CDS 210 may be carried out by demodulator 408 (e.g., a first demodulator that connects to communication connection interface 402). After recovering the combined digital signal, demodulator 408 may provide the recovered combined digital signal to a conditioning device of signal conditioner 108, such as the modulator 410 or the processor 412.

Next, at block 604, signal conditioner 108 conditions the combined digital signal in preparation for transmission of the combined digital signal over transport medium 110. Conditioning the combined digital signal may include conditioning the signal for transmission over various types of transport media (e.g., a wireless transport medium and a wireline transport medium). In conditioning the combined digital signal a conditioned combined digital signal (e.g., conditioned CDS 212) is produced.

In one respect, modulator 410 may carry out at least a portion of the conditioning of the combined digital signal. For example, modulator 410 may modulate a carrier with the recovered combined digital signal so as to produce the conditioned CDS 212. This carrier may include an RF carrier such that the conditioned CDS 212 is an RF modulated signal. After producing the conditioned CDS 212, modulator 410 may provide the conditioned CDS 212 to transport medium interface 406 or to processor 412, via connection mechanism 416.

In another respect, processor 412 may execute program instructions to carry out at least a portion of the conditioning of the combined digital signal. Processor 412 may receive the conditioned CDS 212 from modulator 410 and perform additional conditioning to the conditioned CDS 212 or receive the combined digital signal directly from demodulator 408.

Processor 412 may carry out conditioning of the combined CDS 212 or the combined digital signal in various ways. As an example, processor 412 may execute program instructions to carry out combining the conditioned CDS 212 with the other data traffic 214 received at network interface 404 so as to produce the combined data traffic 216. As another example, processor 412 may execute program instructions to condition the combined digital signal by interleaving or multiplexing the combined digital signal with the other data traffic 214. As yet another example, processor 412 may execute program instructions to condition the combined digital signal by placing the combined digital signal, alone or in combination with the other data traffic 214, into packets such as Ethernet packets as specified by IEEE 802.3 standards. Other examples of processor 412 executing program instructions to carry out conditioning of the conditioned CDS 212 or the combined digital signal are also possible.

After conditioning the RF CDS 210 to produce the conditioned CDS 212, signal conditioner 108 provides the conditioned CDS 212 to transport medium interface 406 for subsequent transmission of the conditioned CDS 212 over transport medium 110. Alternatively, if signal conditioner 108 combines the combined digital signal recovered from the RF CDS 210 or the conditioned CDS 212, with other data traffic 214 to form combined data traffic 216, then signal conditioner 108 may provide the combined digital signal to transport medium 110 by providing the combined data traffic 216 to transport medium 110.

Next, at block 606, transport medium 110 transports the conditioned CDS 212 from signal conditioner 108 to signal conditioner 106. In one respect, transmission of the conditioned CDS 212 over transport medium 110 may be carried out via a single transport medium capable of transporting the conditioned CDS 212. For example, the conditioned CDS 212 may be transmitted over a broadband wireline transport medium or a broadband wireless transport medium.

In another respect, transmission of the conditioned CDS 212 over transport medium 110 may be carried out via transport media capable of transporting the conditioned CDS 212. As an example, the conditioned CDS 212 may be transmitted over transport media comprising a broadband wireline transport medium and a broadband wireless transport medium. The entire conditioned CDS 212 may be transmitted over both the broadband wireline transport medium and the broadband wireless transport medium substantially simultaneously. Alternatively, a first portion of the conditioned CDS 212 may be transmitted over the broadband wireline transport medium and a second portion of the conditioned CDS 212 may be transmitted over the broadband wireless transport medium.

In yet another respect, transport medium 110 may function as a shared transport medium so as to transport the conditioned CDS 212 and the other data traffic 214 over transport medium 110. In this regard, transport medium 110 may transport the conditioned CDS 212 and the other data traffic 214 individually or as combined data traffic 216.

Signal conditioner 108 or another entity may combine the conditioned CDS 212 and the other data traffic 214 to form the combined data traffic 216. As an example, processor 412 may execute program instructions to carry out forming the combined data traffic 216 from the conditioned CDS 212 and the other data traffic 214. After formation of the combined data traffic 216, processor 412 may provide the combined data traffic 216 to transport medium interface 406 for subsequent transmission over transport medium 110. As another example, a network server remote from signal conditioner 108 may combine the conditioned CDS 212 and the other data 214 to provide the combined data traffic 216.

Signal conditioner 106 may receive the conditioned CDS 212 separately or within the combined data traffic 216 that includes the conditioned CDS 212 and the other data traffic 214. Signal conditioner 106 receives the conditioned CDS 212 at transport medium interface 306.

Next, at block 608, signal conditioner 106 recovers the conditioned CDS 212 transported over transport medium 110 and subsequently conditions the recovered CDS in preparation for transmission of the recovered CDS to the BTS 102.

Signal conditioner 106 recovers the CDS from the conditioned CDS 212 using a method appropriate for how the conditioned CDS 212 is transported across transport medium 110. For example, if conditioned CDS 212 is transported across transport medium 110 as a modulated signal, the conditioned CDS 212 may be sent to demodulator 308. In this way, demodulator 308 can demodulate the conditioned signal 212 so as to recover the conditioned digital signal.

In the case when the conditioned CDS 212 is transported across transport medium 110 as combined data traffic 216, various methods may be used to recover the conditioned CDS 212. As an example, signal conditioner 106 may receive the combined data traffic 216 at transport medium interface 306 and responsively provide the combined data traffic to processor 312. In this way, processor 312 may execute program instructions to (i) separate the combined data traffic 216 to recover the conditioned CDS 212 and the other data traffic 214, (ii) condition the recovered conditioned CDS 212, (e.g., by providing the conditioned CDS 212 to demodulator 308 if the conditioned CDS 212 is modulated), or perform other conditioning methods if the conditioned CDS 212 is packetized, and (iii) provide the other data traffic 214 to network interface 304. After receiving the recovered other data traffic 214, network interface 304 may transmit the other data traffic 214 to its destination via a network interfacing to network interface 304.

As another example, a network entity located between transport medium 110 and signal conditioner 106 may (i) receive the combined data traffic 216, (ii) separate the combined data traffic 216 to recover the conditioned CDS 212 and the other data traffic 214, (iii) provide the conditioned CDS 212 to signal conditioner 106, and (iv) provide the other data traffic 214 to a network that interfaces to this network entity. In accordance, with this example, signal conditioner 106 may receive the conditioned CDS 212 and use demodulator 308 and/or processor 312 to condition the conditioned CDS 212 as described above.

Signal conditioner 106 may provide the conditioned CDS 212 to modulator 310. Modulator 310 modulates an RF carrier with the conditioned CDS 212, recovered at signal conditioner 106, so as to produce an RF signal representing the combined digital signal (e.g., RF CDS 218). As an example, modulator 310 may perform modulation in accordance with the CDMA protocol. In this regard, the RF CDS 218 may be arranged as a CDMA RF signal. Other examples of the modulation performed to produce the RF CDS 218, such as TDMA modulation or OFDMA modulation are also possible.

An output of modulator 310 transmits the RF CDS 218 to antenna feed interface 302. Antenna feed interface 302 transmits the RF CDS 218 to BTS 102 via antenna feed 112.

Next, at block 610, BTS 102 receives the combined digital signal as conditioned at signal conditioner 106. BTS 102 may receive the combined digital signal by receiving the RF CDS 218 that represents the combined digital signal. BTS 102 receives the RF CDS 218 from signal conditioner 106 via antenna feed 112.

After receiving the combined digital signal conditioned at signal conditioner 106, (i.e., after receiving the RF CDS 218), the BTS 102 may recover the combined digital signal from the RF CDS 218 and then separate the combined digital signal to obtain data from the communication and control channels used to form the combined digital signal, process this data, and then transmit this processed data to its destination as appropriate to an entity of a transport network (e.g., a gateway of a packet switched network or a switch in a circuit-switched network). Other examples of BTS 102 communicating the RF CDS 218 or the combined digital signal are also possible.

4. Conclusion

Exemplary embodiments of the present invention have been described above. Those skilled in the art will understand, however, that changes and modifications may be made to the embodiments described without departing from the true scope and spirit of the present invention, which is defined by the claims.

We claim:

1. A method of communication, the method comprising:
   a base transceiver station (BTS) producing a combined digital signal by combining digital signals from multiple forward-link communication channels, wherein the BTS comprises an antenna feed interface that connects to an antenna via a first antenna feed, and to a first signal conditioner via a second antenna feed;
   the BTS modulating a radio frequency (RF) carrier with the combined digital signal so as to produce a first RF signal representing the combined digital signal produced by the BTS;
   the BTS providing the first RF signal representing the combined digital signal to the antenna via the first antenna feed, and to the first signal conditioner via the second antenna feed, wherein the antenna subsequently transmits the first RF signal representing the combined digital signal to one or more mobile phones via an air interface;
   the first signal conditioner receiving, from the BTS via the second antenna feed, the first RF signal representing the combined digital signal;
   the first signal conditioner demodulating the first RF signal representing the combined digital signal so as to recover the combined digital signal;
   the first signal conditioner receiving other data traffic from a network that connects to a network interface at the first signal conditioner;
   the first signal conditioner combining the combined digital signal recovered from the first RF signal and the other data traffic to form combined data traffic; and
   the first signal conditioner providing the combined data traffic to a shared transport medium for transmission, in turn, to a second signal conditioner.

2. The method of claim 1, wherein the combined data traffic provided to the shared transport medium is transmitted to one or more other signal conditioners that are remote from the first signal conditioner.

3. The method of claim 1, further comprising:
   the second signal conditioner conditioning the combined data traffic to recover the combined digital signal and the other data traffic, and thereafter providing the recovered combined digital signal to a remote antenna entity, and providing the recovered other data traffic to a network that connects to a network interface at the second signal conditioner;
   the remote antenna entity modulating a second RF carrier with the combined digital signal provided to the remote antenna entity so as to produce a second RF signal representing the combined digital signal; and
   the remote antenna entity providing the second RF signal to an antenna feed of the remote antenna entity for transmission of the second RF signal via an air interface,
   wherein the second signal conditioner is connected to the remote antenna entity via a communication connection.

4. The method of claim 1, further comprising:
   the second signal conditioner receiving the combined data traffic;
   the second signal conditioner recovering the combined digital signal from the combined data traffic;
   the second signal conditioner modulating a second RF carrier with the combined digital signal recovered from the combined data traffic so as to produce a second RF signal representing the combined digital signal produced by the BTS; and
   providing the second RF signal from the second signal conditioner to a communication connection of a remote antenna entity for processing the second RF signal so as to provide wireless communication service.

5. The method of claim 1, wherein the transport medium is selected from the group consisting of (i) a broadband wireline transport medium, and (ii) a broadband wireless transport medium.

6. The method of claim 5, wherein the broadband wireline transport medium is selected from the group consisting of (i) a coaxial cable transport medium, (ii) an optical fiber transport medium, (iii) a broadband over electrical power line transport medium, (iv) a twisted pair of copper wires.

7. The method of claim 5, wherein the broadband wireless transport medium is selected from the group consisting of (i) a transport medium using a broadband radio frequency, (ii) a free space optics transport medium, (iii) a millimeter wave transport medium, and (iv) a microwave radio transport medium.

8. The method of claim 1, wherein the multiple forward-link communication channels include communication channels selected from the group consisting of (i) voice channels, (ii) data channels, and (iii) control channels.

9. The method of claim 8, wherein the data channels communicate data comprising packetized voice data.

10. The method of claim 1,
wherein the combined digital signal is produced by the BTS, and
wherein the combined digital signal comprises total information to be radiated from the BTS via an air interface.

11. The method of claim 1, wherein the combined data traffic comprises Ethernet packets.

12. At a first signal conditioner comprising a communication connection interface, a network interface, and a transport medium interface, wherein the communication connection interface interfaces to a communication connection that connects the first signal conditioner to a remote antenna entity, a method of communication comprising:
the communication connection interface of the first signal conditioner receiving from a remote antenna entity via the communication connection a first radio frequency (RF) signal representing a combined digital signal, wherein the first RF signal comprises multiple communication channels received at the remote antenna entity from one or more mobile phones;
the first signal conditioner demodulating the received first RF signal so as to recover the combined digital signal;
the network interface receiving data traffic from a wireline network that interfaces to the network interface;
the first signal conditioner forming combined data traffic by placing into Ethernet packets the combined digital signal recovered from the first RF signal, and the data traffic received from the wireline network; and
the transport medium interface of the first signal conditioner providing the combined data traffic to a transport medium for transmission, in turn, to a second signal conditioner connected to an antenna feed of a base transceiver station (BTS).

13. The method of claim 12, wherein the transport medium is selected from the group consisting of (i) a broadband wireline transport medium, and (ii) a broadband wireless transport medium.

14. The method of claim 12, wherein the multiple communication channels include communication channels selected from the group consisting of (i) voice channels, (ii) data channels, and (iii) control channels.

15. The method of claim 12,
wherein the combined digital signal comprises total information to be transmitted from the remote antenna entity to the BTS.

16. The method of claim 12, further comprising:
at the second signal conditioner, receiving the set of Ethernet packets, conditioning the set of Ethernet packets to recover the combined digital signal, and modulating an RF carrier with the combined digital signal recovered from the packets so as to produce a second RF signal representing the combined digital signal; and
transmitting the second RF signal from the second signal conditioner to the BTS, via an antenna feed connecting the second signal conditioner and the BTS, for subsequent communication of the combined digital signal from the BTS.

17. A signal conditioner comprising:
an antenna feed interface connected via an antenna feed to a base transceiver station (BTS), wherein the antenna feed interface is arranged to receive a first radio frequency (RF) signal representing a first combined digital signal;
a transport medium interface for interfacing to a transport medium;
a demodulator; and
a conditioning device,
wherein the first RF signal is produced by modulating a first RF carrier with the first combined digital signal, and wherein the first combined digital signal is produced by combining digital signals from multiple communication channels,
wherein the demodulator is arranged to (i) receive the first RF signal from the antenna feed interface, (ii) demodulate the first RF signal so as to recover the first combined digital signal, and (iii) provide the recovered first combined digital signal to the conditioning device that conditions the recovered first combined digital signal for transmission via the transport medium
wherein the conditioning device comprises a first modulator,
wherein the first modulator is arranged to (i) modulate a second RF carrier with the recovered first combined digital signal so as to produce a second RF signal representing the first combined digital signal, and (ii) provide the second RF signal to the transport medium interface for transmission of the second RF signal via the transport medium to a remote signal conditioner connected to a remote antenna entity,
wherein the transport medium interface receives from the transport medium a third RF signal,
wherein the third RF signal (i) represents a second combined digital signal, and (ii) comprises multiple communication channels produced by one or more wireless communication devices, and received by an antenna connected to the remote antenna entity,
wherein the demodulator is arranged to (i) receive the third RF signal from the transport medium interface, (ii) demodulate the third RF signal so as to recover the second combined digital signal, and (iii) provide the recovered second combined digital signal to the conditioning device,
wherein the conditioning device includes a second modulator arranged to (i) modulate a third RF carrier with the recovered second combined digital signal so as to produce a fourth RF signal, and (ii) provide the fourth RF signal to the antenna feed interface for transmission of the fourth RF signal to the BTS via the antenna feed,
wherein the fourth RF signal represents the second combined digital signal, and
wherein the digital signals combined from multiple communication channels to produce the first combined digital signal are from multiple communication channels associated with the BTS.

18. The signal conditioner of claim 17, further comprising:
data storage, wherein the conditioning device comprises a processor, and wherein the processor executes program instructions stored in data storage to carry out the functions of (i) formatting the recovered first combined digital signal so as to produce a signal representing the recovered first combined digital signal, and (ii) providing the signal representing the recovered first combined digital signal to the transport medium interface for transmission of the signal representing the first recovered combined digital signal via the transport medium to a remote signal conditioner connected to a remote antenna entity.

19. The signal conditioner of claim 18,
wherein the data storage further includes program instructions executable by the processor to communicate data to the remote antenna entity, and
wherein the data indicates (i) a first frequency for transmitting an RF combined digital signal over the air from an antenna, and (ii) a second frequency for the antenna to receive RF signals transmitted over the air.

20. The signal conditioner of claim 17, wherein the first modulator and the demodulator are arranged as a modem.

21. The signal conditioner of claim 17,
wherein the transport medium interface comprises one or more interface modules,
wherein each of the one or more interface modules is connected to a given transport medium, and
wherein the conditioning device provides the second RF signal to the transport medium interface by providing the second RF signal to each of the one or more interface modules for transmission of the second signal via each given transport medium to the remote signal conditioner.

22. The signal conditioner of claim 21, wherein each given transport medium is selected from the group consisting of (i) a broadband wireline transport medium, and (ii) a broadband wireless transport medium.

23. The signal conditioner of claim 17, wherein the transport medium is selected from the group consisting of (i) a broadband wireline transport medium, and (ii) a broadband wireless transport medium.

24. A signal conditioner comprising:
a communication connection interface connected via a communication connection to a remote antenna entity, wherein the communication connection interface is arranged to receive a first radio frequency (RF) signal representing a combined digital signal;
a transport medium interface for interfacing to a shared transport medium;
a network interface to interface with a network that provides data traffic to the signal conditioner;
a demodulator; and
a processor,
wherein the first RF signal (i) comprises multiple communication channels produced by one or more mobile phones, and (ii) is received by an antenna connected to the remote antenna entity,
wherein the demodulator is arranged to (i) receive the first RF signal from the communication connection interface, and (ii) demodulate the first RF signal so as to recover the combined digital signal, and
wherein the processor executes program instructions so as to place the recovered combined digital signal and the data traffic into packets, and to provide the packets to the shared transport medium for transmission, in turn, to a remote signal conditioner that is connected to a base transceiver station.

25. The signal conditioner of claim 24, wherein the remote antenna entity is integrated with the signal conditioner as a signal conditioning remote antenna entity that connects to the transport medium.

26. The signal conditioner of claim 24, wherein the remote antenna entity is separate from the signal conditioner and connected to the signal conditioner via a communication connection.

27. The signal conditioner of claim 24, further comprising a modulator,
wherein the transport medium interface receives other data packets from the shared transport medium,
wherein the other data packets include a second combined digital signal and other data traffic,
wherein the processor recovers the second combined digital signal and the other data traffic from the other data packets, provides the recovered second combined digital signal to the modulator, and provides the recovered other data traffic to the network interface,
wherein the modulator is arranged to (i) modulate a second RF carrier with the recovered second combined digital signal so as to produce a third RF signal, and (ii) provide the third RF signal to the communication connection interface for transmission of the third RF signal to the remote antenna entity,
wherein the third RF signal represents the second combined digital signal, and
wherein the second combined digital signal is produced at a base transceiver station (BTS) by combining digital signals from multiple communication channels associated with the BTS, and
wherein the network interface transmits the recovered other data traffic via the network that interfaces to the network interface.

28. The method of claim 24, wherein the packets are Ethernet packets.

29. A method of communication, the method comprising:
a first signal conditioner receiving a combined digital signal from a base transceiver station (BTS) via a first antenna feed extending from the BTS to the first signal conditioner, wherein the combined digital signal is produced by combining digital signals from multiple communication channels;
the first signal conditioner receiving data traffic from a network that connects to a network interface at the first signal conditioner;
the first signal conditioner placing the combined digital signal and the data traffic into packets, and providing the packets to a shared transport medium for transmission, in turn, to a second signal conditioner; and
the first signal conditioner providing the combined digital signal to a shared transport medium for transmission, in turn, to a second signal conditioner,
wherein the second signal conditioner is connected to a remote antenna entity by a communication connection,
the second signal conditioner recovering the combined digital signal and the data traffic from the packets, providing the combined digital signal recovered from the packets to the remote antenna entity via the communication connection, and providing the data traffic recovered from the packets to a network that connects to a network interface at the second signal conditioner.

30. The method of claim 29,
wherein the shared transport medium includes transport media, the method further comprising:
detecting a failure of a first transport medium of the transport media, and switching from the failed first transport medium to a second transport medium of the transport media so as to transmit the combined digital signal and the other data traffic via the second transport medium.

31. The method of claim 30, wherein the first transport medium comprises a transport medium selected from the group consisting of (i) a first broadband wireline transport medium, and (ii) a first broadband wireless transport medium, and wherein the second transport medium comprises a transport medium selected from the group consisting of (i) a second broadband wireline transport medium, and (ii) a second broadband wireless transport medium.

32. The method of claim 29, wherein the second signal conditioner is arranged to produce another combined digital signal and to provide the other combined digital signal to the shared transport medium, and wherein the first signal conditioner is arranged to receive the other combined digital signal from the shared transport medium.

33. A method of communication, the method comprising:

a first signal conditioner receiving a radio frequency (RF) signal representing a combined digital signal, wherein the first signal conditioner receives the RF signal from a remote antenna entity via a communication connection extending from the remote antenna entity to the first signal conditioner, and wherein the combined digital signal (i) comprises multiple communication channels produced by one or more mobile phones, and (ii) is received by an antenna connected to the remote antenna entity, the first signal conditioner receiving data traffic from a network that connects to a network interface at the first signal conditioner;

the first signal conditioner placing the combined digital signal and the data traffic into Ethernet packets, and providing the Ethernet packets to a shared transport medium for transmission, in turn, to a second signal conditioner, wherein the second signal conditioner is connected to a base transceiver station (BTS) by an antenna feed, and the second signal conditioner recovering the combined digital signal and the data traffic from the Ethernet packets, providing the combined digital signal recovered from the Ethernet packets to the BTS via the antenna feed, and providing the data traffic recovered from the Ethernet packets to a network that connects to a network interface at the second signal conditioner.

34. The method of claim 33, wherein the shared transport medium includes transport media, the method further comprising:

detecting a failure of a first transport medium of the transport media, and switching from the failed first transport medium to a second transport medium of the transport media so as to transmit the combined digital signal and the other data traffic via the second transport medium.

35. The method of claim 34, wherein the first transport medium comprises a transport medium selected from the group consisting of (i) a first broadband wireline transport medium, and (ii) a first broadband wireless transport medium, and wherein the second transport medium comprises a transport medium selected from the group consisting of (i) a second broadband wireline transport medium, and (ii) a second broadband wireless transport medium.

36. The method of claim 33, wherein the second signal conditioner is arranged to produce another combined digital signal and to provide the other combined digital signal to the shared transport medium, and wherein the first signal conditioner is arranged to receive the other combined digital signal from the shared transport medium.

\* \* \* \* \*

UNITED STATES PATENT AND TRADEMARK OFFICE
CERTIFICATE OF CORRECTION

| | | |
|---|---|---|
| PATENT NO. | : 7,634,250 B1 | Page 1 of 1 |
| APPLICATION NO. | : 11/378998 | |
| DATED | : December 15, 2009 | |
| INVENTOR(S) | : Prasad et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 754 days.

Signed and Sealed this

Ninth Day of November, 2010

David J. Kappos
*Director of the United States Patent and Trademark Office*